(12) United States Patent
Liu et al.

(10) Patent No.: US 10,930,000 B2
(45) Date of Patent: Feb. 23, 2021

(54) METHOD AND SYSTEM FOR DETECTING AND TRACKING OBJECTS USING CHARACTERISTIC POINTS

(71) Applicant: SZ DJI TECHNOLOGY CO., LTD., Shenzhen (CN)

(72) Inventors: Ang Liu, Shenzhen (CN); Pu Xu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 83 days.

(21) Appl. No.: 16/426,921

(22) Filed: May 30, 2019

(65) Prior Publication Data

US 2019/0279387 A1 Sep. 12, 2019

Related U.S. Application Data

(63) Continuation of application No. PCT/CN2016/108281, filed on Dec. 1, 2016.

(51) Int. Cl.
*G06T 7/593* (2017.01)
*H04N 13/271* (2018.01)
(Continued)

(52) U.S. Cl.
CPC .......... *G06T 7/593* (2017.01); *B64C 39/024* (2013.01); *G06K 9/0063* (2013.01); *G06K 9/00201* (2013.01); *G06K 9/342* (2013.01); *G06K 9/4642* (2013.01); *G06K 9/4671* (2013.01); *G06T 7/11* (2017.01); *G06T 7/136* (2017.01); *G06T 7/194* (2017.01); *G06T 7/246* (2017.01); *G06T 7/70* (2017.01); *H04N 13/271* (2018.05);
(Continued)

(58) Field of Classification Search
USPC ................................. 382/103, 104, 106, 154
See application file for complete search history.

(56) References Cited

U.S. PATENT DOCUMENTS

| 7,512,262 | B2 * | 3/2009 | Criminisi | G06K 9/00241 |
| | | | | 382/106 |
| 7,974,442 | B2 * | 7/2011 | Camus | G06K 9/00201 |
| | | | | 382/103 |

(Continued)

FOREIGN PATENT DOCUMENTS

| CN | 104715249 A | 6/2015 |
| CN | 105930766 A | 9/2016 |
| EP | 2713338 A1 | 4/2014 |

OTHER PUBLICATIONS

World Intellectual Property Organization (WIPO) International Search Report and Written Opinion for PCT/CN2016/108281 dated Sep. 12, 2017 8 Pages.

*Primary Examiner* — Ishrat I Sherali
(74) *Attorney, Agent, or Firm* — Anova Law Group, PLLC

(57) ABSTRACT

A method includes obtaining a disparity map based on stereoscopic image frames captured by stereoscopic cameras borne on a movable platform, determining a plurality of continuous regions in the disparity map that each includes a plurality of elements having disparity values within a predefined range, identifying a continuous sub-region including one or more elements having a highest disparity value among the elements within each continuous region as an object, and determining a distance between the object and the movable platform using at least the highest disparity value.

20 Claims, 26 Drawing Sheets

(51) Int. Cl.
*G06T 7/70* (2017.01)
*B64C 39/02* (2006.01)
*G06T 7/136* (2017.01)
*G06T 7/194* (2017.01)
*G06K 9/00* (2006.01)
*G06K 9/46* (2006.01)
*G06K 9/34* (2006.01)
*G06T 7/246* (2017.01)
*G06T 7/11* (2017.01)

(52) U.S. Cl.
CPC .. *B64C 2201/123* (2013.01); *B64C 2201/127* (2013.01); *G06K 9/00805* (2013.01); *G06T 2207/10021* (2013.01); *G06T 2207/10028* (2013.01); *G06T 2207/10032* (2013.01); *G06T 2207/30241* (2013.01); *G06T 2207/30244* (2013.01); *G06T 2207/30252* (2013.01)

(56) References Cited

U.S. PATENT DOCUMENTS

| | | | |
|---|---|---|---|
| 8,488,870 B2* | 7/2013 | Martinez-Bauza | G06T 7/97 382/154 |
| 9,842,400 B2* | 12/2017 | Shin | G06T 7/593 |
| 2004/0223640 A1* | 11/2004 | Bovyrin | G06T 7/97 382/154 |
| 2004/0258279 A1 | 12/2004 | Hirvonen et al. | |
| 2013/0177237 A1* | 7/2013 | Schamp | G06K 9/50 382/154 |
| 2015/0294160 A1* | 10/2015 | Takahashi | H04N 13/204 382/104 |
| 2016/0165216 A1* | 6/2016 | Wu | G06T 7/97 348/223.1 |
| 2018/0054604 A1* | 2/2018 | Boyd | G01C 3/10 |
| 2019/0080464 A1* | 3/2019 | Lee | G06T 7/246 |
| 2019/0172215 A1* | 6/2019 | Zhang | G06T 7/579 |
| 2019/0318494 A1* | 10/2019 | Tsai | G06T 7/174 |

* cited by examiner

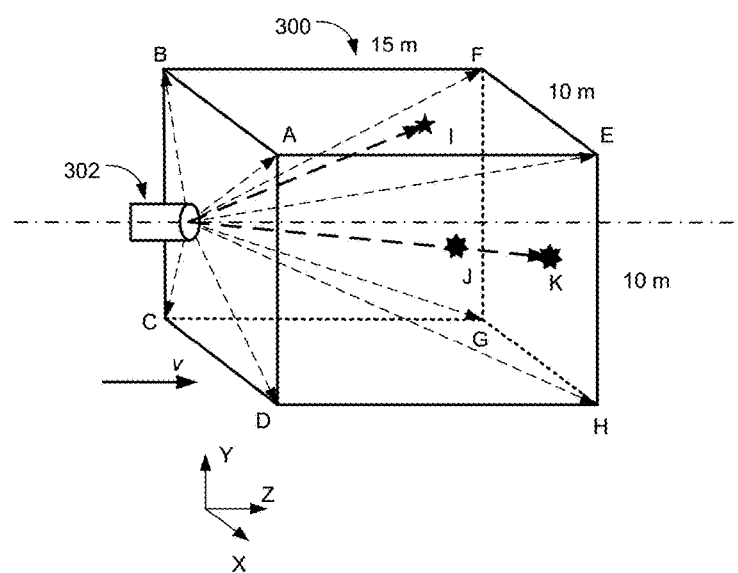
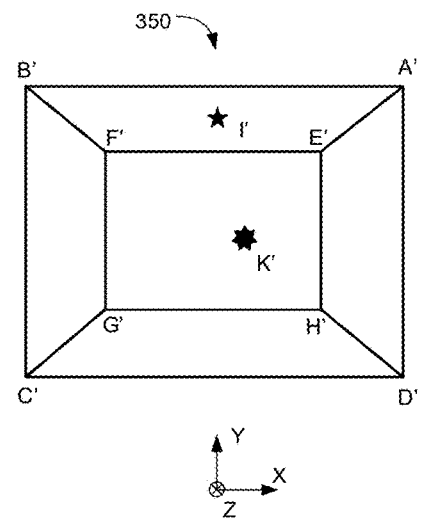
Figure 3A                                    Figure 3B

700

701
Obtain a disparity map based on stereoscopic image frames captured by stereoscopic cameras borne on a movable platform.

702
Receive a 2-dimensional mask including a plurality of projection points defining a predefined 3-dimensional volume adjacent the movable platform, each projection point having a threshold disparity value for objects within the predefined 3-dimensional volume.

(A)

704
Select, among the disparity map, a subset of elements by comparing disparity values of the elements with the threshold disparity values on the 2-dimensional mask that correspond to projections of the elements onto the 2-dimensional mask, wherein the subset of elements represent actual objects within the predefined 3-dimensional volume.

820
Determining the plurality of continuous regions comprises:
dividing the disparity map into a plurality of areas using a grid;
identifying an element having a highest disparity value in each area; and
selecting, within each area, one or more contiguous elements to form a
respective continuous region of the plurality of continuous regions, wherein
differences between respective disparity values of the contiguous elements
and the highest disparity value are within the predefined range.

822
Differences of disparity values between neighboring elements of the plurality of
elements in each continuous region are within the predefined range.

824
Determine a plurality of first boxes enclosing the plurality of continuous
regions respectively.

826
Determine a second box within each first box as a continuous sub-region,
the second box enclosing the one or more elements with the highest
disparity values in the corresponding first box, wherein elements within a
second box have disparity values within a range from (Dmax+Dmin)/2 to
Dmax, wherein Dmax and Dmin correspond to the highest disparity value
and the lowest disparity value respectively within a corresponding first
box enclosing the second box.

830
Track the objects as the movable platform moves along a navigation
path based on an updated disparity map and an updated location of
the movable platform.

902
Identify, within a disparity map, an object for tracking by a movable platform.

(F)

904
Determine a location of an element representing the object in a first image frame captured by an imaging device borne on the movable platform.

(G)

906
Select one or more characteristic points of the element representing the object as tracking points of the object on the first image frame.

(H)

908
Update the locations of the tracking points of the element on a second image frame captured by the imaging device in accordance with an updated disparity map and a current location of the movable platform.

910
Obtain the disparity map based on stereoscopic image frames captured by stereoscopic cameras borne on the movable platform.

912
Determine a a continuous region including one or more elements having disparity values within a predefined range as the object, the disparity values of the one or more elements being higher than that of the other elements within the continuous region.

914
Select, from a raw disparity map obtained directly from the stereoscopic image frames, a subset of disparity values for the disparity map between threshold disparity values of corresponding projection points on a 2-dimensional mask, wherein the 2-dimensional mask includes a plurality of projection points defining a predefined 3-dimensional volume adjacent the movable platform, each projection point having a threshold disparity value for objects within the predefined 3-dimensional volume, and
wherein the subset of disparity values represent actual objects within the predefined 3-dimensional volume.

H

916
The one or more characteristic points are selected to be closer to a navigation path of the movable platform than other parts of the object.

G

918
The location of the element representing the object on the first image frame is determined based on relative spatial information between the imaging device and the movable platform.

920
The current location of the movable platform is determined based on data from a plurality of sensors associated with the movable platform.

922
Updating the locations of the tracking points on the second image frame further comprises:
tracking motion trails of the tracking points using optical flow generated from the tracking points from the first image frame to the second image frame.

Ⓙ

924
Determine a distance between the object and the movable platform based on information obtained from the updated disparity map.

926
In accordance with a determination that the distance between the object and the movable platform is within a predetermined threshold value, generating a notification to be sent to a controlling device of the movable platform.

Figure 9C

METHOD AND SYSTEM FOR DETECTING AND TRACKING OBJECTS USING CHARACTERISTIC POINTS

CROSS-REFERENCE TO RELATED APPLICATION

This application is a continuation of International Application No. PCT/CN2016/108281, filed on Dec. 1, 2016, the entire content of which is incorporated herein by reference.

TECHNICAL FIELD

The disclosed embodiments relate generally to operating a movable platform and more particularly, but not exclusively, to detecting and tracking objects based on characteristic points.

BACKGROUND

Movable platforms (e.g., movable objects) such as unmanned aerial vehicles (UAVs) can be used for performing surveillance, reconnaissance, and exploration tasks for military and civilian applications. A movable platform may carry a payload configured to perform a specific function. For example, the payload may include an imaging device for capturing image data of the surrounding environment for avoiding obstacles and tracking targets in the surrounding environment. It is important to efficiently and accurately detect and track objects included in image frames captured by the imaging device.

SUMMARY

There is a need for systems and methods for devices that process image data including disparity depth data for detecting and tracking objects using image frames captured by stereoscopic cameras and an imaging device borne by a movable platform. Such systems and methods optionally complement or replace conventional methods for processing image data. By processing image data including disparity depth data with the aid of sensor data obtained from one or more sensors borne by the movable platform, and by using characteristic points identified from the image data for objects detection and tracking, some embodiments of the present application can significantly improve the efficiency and accuracy in image data processing and objects detection and tracking. Additionally, the image processing techniques as disclosed herein can be performed after or in real time as the movable platform moves along a path and captures image data.

In accordance with some embodiments, a method for selecting disparity map comprises: obtaining a disparity map based on stereoscopic image frames captured by stereoscopic cameras borne on a movable platform. The method further comprises receiving a 2-dimensional mask including a plurality of projection points defining a predefined 3-dimensional volume adjacent the movable platform. Each projection point has a threshold disparity value for objects within the predefined 3-dimensional volume. The method also comprises selecting, among the disparity map, a subset of elements by comparing disparity values of the elements with the threshold disparity values on the 2-dimensional mask that correspond to projections of the elements onto the 2-dimensional mask. The subset of elements represent actual objects within the predefined 3-dimensional volume.

In accordance with some embodiments, a system may comprise one or more processors coupled to the imaging device; memory; and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the electronic device, cause the electronic device to perform the operations of the above method.

In accordance with some embodiments, a method for detecting objects comprises: obtaining a disparity map based on stereoscopic image frames captured by stereoscopic cameras borne on a movable platform. The method further comprises determining a plurality of continuous regions in the disparity map. Each continuous region includes a plurality of elements having disparity values within a predefined range. The method further comprises identifying, within each continuous region, a continuous sub-region including one or more elements having a highest disparity value than that of the other elements within the continuous region as an object. The method also comprises determining a distance between the object and the movable platform using at least the highest disparity value.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise one or more processors coupled to the imaging device; memory; and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by the electronic device, cause the electronic device to perform the operations of the above method.

In accordance with some embodiments, a method for tracking objects comprises: identifying an object for tracking by a movable platform within a disparity map. The method further comprises determining a location of an element representing the object in a first image frame captured by an imaging device borne on the movable platform. The method further comprises selecting one or more characteristic points of the element representing the object as tracking points of the object on the first image frame. The method also comprises updating the locations of the tracking points of the element on a second image frame captured by the imaging device in accordance with an updated disparity map and a current location of the movable platform.

In accordance with some embodiments, an unmanned aerial vehicle (UAV) may comprise a propulsion system, one or more sensors, an imaging device, and one or more processors coupled to the propulsion system, the one or more sensors, and the imaging device. The one or more processors are configured for performing the operations of the above method. In accordance with some embodiments, a system may comprise one or more processors coupled to the imaging device; memory; and one or more programs. The one or more programs are stored in the memory and configured to be executed by the one or more processors.

The one or more programs including instructions for performing the operations of the above method. In accordance with some embodiments, a non-transitory computer-readable storage medium has stored therein instructions that, when executed by the electronic device, cause the electronic device to perform the operations of the above method.

BRIEF DESCRIPTION OF THE DRAWINGS

FIGS. 3A and 3B illustrate a process for preparing an exemplary 2-dimensional mask from a predefined 3-dimensional space, in accordance with some embodiments.

FIGS. 7A-7B are a flow diagram illustrating a method for selecting disparity map, in accordance with some embodiments.

FIGS. 8A-8C are a flow diagram illustrating a method for processing image data for detecting objects by a movable platform, in accordance with some embodiments.

FIGS. 9A-9C are a flow diagram illustrating a method for processing image data for tracking objects by a movable platform, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable object (or a movable platform). UAVs include, e.g., fixed-wing aircrafts and rotary-wing aircrafts such as helicopters, quadcopters, and aircraft having other numbers and/or configurations of rotors. In some embodiments, the movable platform also includes, but is not limited to, a self-driving car (i.e., an autonomous car, a driverless car), a virtual reality (VR) headset, an augmented reality (AR) headset, a handheld gimbal with a camera and image processing capabilities. It will be apparent to those skilled in the art that other types of movable platforms may be substituted for UAVs as described below, such as a mobile phone, a tablet, or a remote control.

The present disclosure provides techniques related to processing image data including disparity depth map captured by stereoscopic cameras borne on a movable for detecting and tracking objects. In some embodiments, a disparity map is obtained based on stereoscopic image frames captured by stereoscopic cameras borne on a movable platform. A plurality of continuous regions are determined to have elements with disparity values within a predefined range. Within each continuous region, a continuous sub-region is identified with elements having the highest disparity value, i.e., a continuous sub-region being closest to the movable platform, as an object for detection. A distance between the object and the movable platform is determined. Furthermore, characteristic points are identified for tracking the objects. Locations of the characteristic points are identified on image frames captured by an imaging device borne on the movable platform, and the locations are updated in accordance with updated disparity map and updated spatial information of the movable platform. Efficient and accurate image processing and objects detection and tracking can be achieved using the image processing techniques disclosed in the present application.

Figure 1:
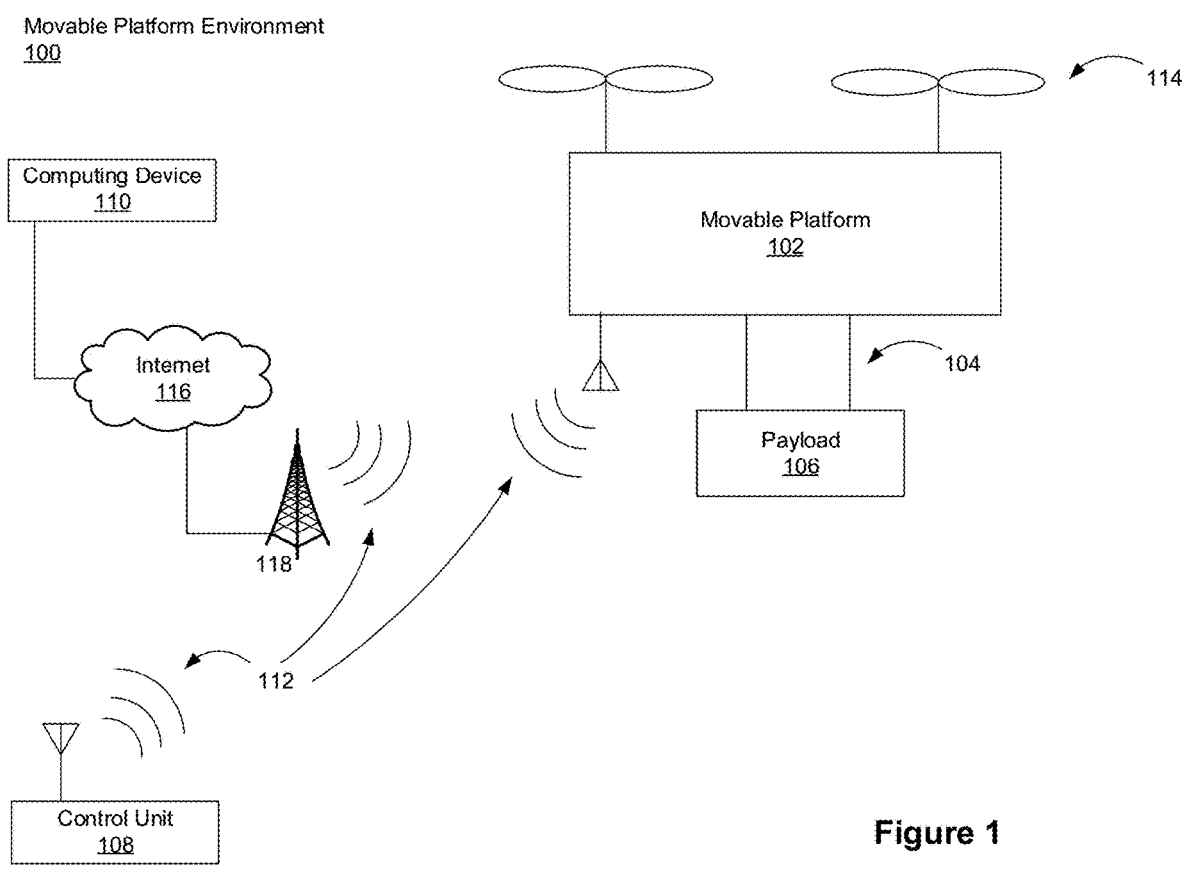
FIG. 1 illustrates a movable platform environment, in accordance with some embodiments.

FIG. 1 illustrates a movable platform environment 100, in accordance with some embodiments. The movable platform environment 100 includes a movable platform 102. In some embodiments, the movable platform 102 includes a carrier 104 and/or a payload 106.

In some embodiments, the carrier 104 is used to couple the payload 106 to the movable platform 102. In some embodiments, the carrier 104 includes an element (e.g., a gimbal and/or damping element) to isolate the payload 106 from movement of the movable platform 102 and/or the movement mechanism 114. In some embodiments, the carrier 104 includes an element for controlling movement of the payload 106 relative to the movable platform 102.

In some embodiments, the payload 106 is coupled (e.g., rigidly coupled) to the movable platform 102 (e.g., coupled via carrier 104) such that the payload 106 remains substantially stationary relative to movable platform 102. For example, the carrier 104 is coupled to the payload 106 such that the payload is not movable relative to the movable platform 102. In some embodiments, the payload 106 is mounted directly to the movable platform 102 without requiring the carrier 104. In some embodiments, the payload 106 is located partially or fully within the movable platform 102.

In some embodiments, a remote control 108 communicates with the movable platform 102, e.g., to provide control instructions to the movable platform 102 and/or to display information received from the movable platform 102 on a display (not shown) of the remote control 108. Although the remote control 108 is typically a portable (e.g., handheld) device, the remote control 108 need not be portable. In some embodiments, the remote control 108 is a dedicated control device (e.g., for the movable platform 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the remote control 108 receives user input to control aspects of the movable platform 102, the carrier 104, the payload 106, and/or a component thereof. Such aspects include, e.g., orientation, position, orientation, velocity, acceleration, navigation, and/or tracking. For example, a position of an input device of the remote control 108 (e.g., a position of a component of the input device) is manually set by a user to a position corresponding to an input (e.g., a predetermined input) for controlling the movable platform 102. In some embodiments, the input device is manipulated by a user to input control instructions for controlling the navigation of the movable platform 102. In some embodiments, an input device of remote control 108 is used to input a flight mode for the movable platform 102, such as auto pilot or navigation according to a predetermined navigation path.

In some embodiments, the display (not shown) of the remote control 108 displays information generated by the movable platform sensing system 210, the memory 204, and/or another system of the movable platform 102. For example, the display displays information about the movable platform 102, the carrier 104, and/or the payload 106, such as position, orientation, orientation, movement characteristics of the movable platform 102, and/or distance between the movable platform 102 and another object (e.g., a target and/or an obstacle). In some embodiments, information displayed by the display of remote control 108 includes images captured by an imaging device 216 (FIG. 2A), tracking data (e.g., a graphical tracking indicator applied to a representation of a target), and/or indications of control data transmitted to the movable platform 102. In some embodiments, information displayed by the display of the remote control 108 is displayed in substantially real-time as information is received from the movable platform 102 and/or as image data is acquired. In some embodiments, the display of the remote control 108 is a touchscreen display.

In some embodiments, the movable platform environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable platform 102 and/or the remote control 108. In some embodiments, the computing device 110 provides data storage, data retrieval, and/or data processing operations, e.g., to reduce the processing power and/or data storage requirements of the movable platform 102 and/or the remote control 108. For example, the computing device 110 is communicatively connected to a database and/or the computing device 110 includes a database. In some embodiments, the computing device 110 is used in lieu of or in addition to the remote control 108 to perform any of the operations described with regard to the remote control 108.

In some embodiments, the movable platform 102 communicates with a remote control 108 and/or a computing device 110, e.g., via wireless communications 112. In some embodiments, the movable platform 102 receives information from the remote control 108 and/or the computing device 110. For example, information received by the movable platform 102 includes, e.g., control instructions for controlling movable platform 102. In some embodiments, the movable platform 102 transmits information to the remote control 108 and/or the computing device 110. For example, information transmitted by the movable platform 102 includes, e.g., images and/or video captured by the movable platform 102.

In some embodiments, communications between the computing device 110, the remote control 108 and/or the movable platform 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the remote control 108 and/or the movable platform 102 include control instructions. Control instructions include, e.g., navigation instructions for controlling navigational parameters of the movable platform 102 such as position, orientation, orientation, and/or one or more movement characteristics of the movable platform 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable platform 102. In some embodiments, control instructions adjust movement of the carrier 104 relative to the movable platform 102 with up to six degrees of freedom.

In some embodiments, control instructions are used to adjust one or more operational parameters for the payload 106. For example, control instructions include instructions for adjusting an optical parameter (e.g., an optical parameter of the imaging device 216). In some embodiments, control instructions include instructions for adjusting imaging properties and/or image device functions, such as capturing an image, initiating/ceasing video capture, powering an imaging device 216 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 216.

In some embodiments, when control instructions are received by movable platform 102, the control instructions change parameters of and/or are stored by memory 204 (FIG. 2A) of movable platform 102.

Figure 2A:
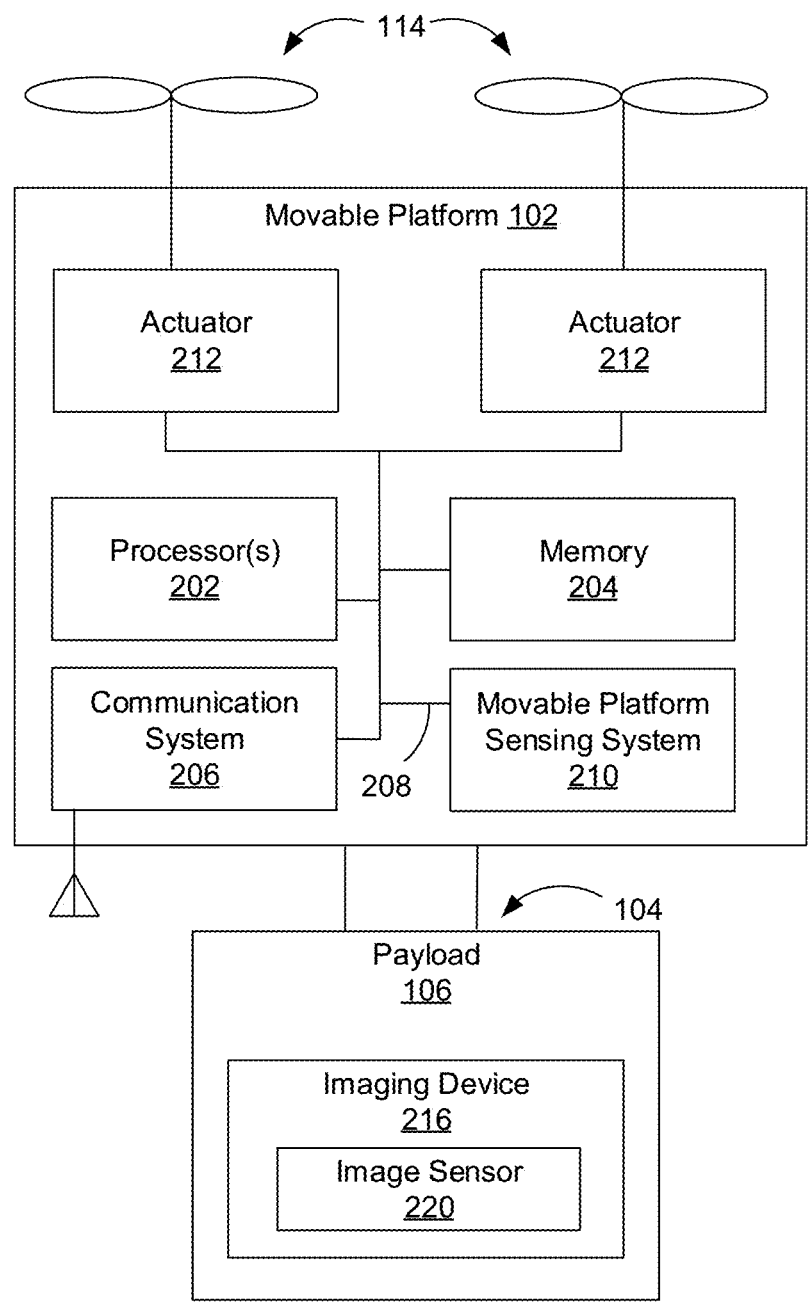
FIG. 2A illustrates a movable platform, in accordance with some embodiments.

FIG. 2A illustrates an exemplary movable platform 102, in accordance with some embodiments. The movable platform 102 typically includes one or more processor(s) 202, a memory 204, a communication system 206, a movable platform sensing system 210, and one or more communication buses 208 for interconnecting these components.

In some embodiments, the movable platform 102 is a UAV and includes components to enable flight and/or flight control. In some embodiments, the movable platform 102 includes communication system 206 with one or more network or other communications interfaces (e.g., via which flight control instructions are received), one or more movement mechanisms 114, and/or one or more movable platform actuators 212 (e.g., to cause movement of movement mechanisms 114 in response to received control instructions). Although the movable platform 102 is depicted as an aircraft, this depiction is not intended to be limiting, and any suitable type of movable platform can be used. Actuator 212 is, e.g., a motor, such as a hydraulic, pneumatic, electric, thermal, magnetic, and/or mechanical motor.

In some embodiments, the movable platform 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable platform 102 at, e.g., the top, bottom, front, back, and/or sides. In some embodiments, the movement mechanisms 114 of a single movable platform 102 include multiple movement mechanisms of the same type. In some embodiments, the movement mechanisms 114 of a single movable platform 102 include multiple movement mechanisms with different movement mechanism types. The movement mechanisms 114 are coupled to the movable platform 102 using any suitable means, such as support elements (e.g., drive shafts) and/or other actuating elements (e.g., the movable platform actuators 212). For example, a movable platform actuator 212 receives control signals from the processor(s) 202 (e.g., via the control bus 208) that activates the movable platform actuator 212 to cause movement of a movement mechanism 114. For example, the processor(s) 202 include an electronic speed controller that provides control signals to a movable platform actuator 212.

In some embodiments, the movement mechanisms 114 enable the movable platform 102 to take off vertically from a surface or land vertically on a surface without requiring any horizontal movement of the movable platform 102 (e.g., without traveling down a runway). In some embodiments, the movement mechanisms 114 are operable to permit the movable platform 102 to hover in the air at a specified position and/or orientation. In some embodiments, one or more of the movement mechanisms 114 are controllable independently of one or more of the other movement mechanisms 114. For example, when the movable platform 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable platform 102. The multiple rotors are actuated to provide, e.g., vertical takeoff, vertical landing, and hovering capabilities to the movable platform 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable platform 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "elements" herein. One or more elements described with regard to the memory 204 are optionally stored by the remote control 108, the computing device 110, and/or another device. In some embodiments, imaging device 216 includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable platform 102 is stored as a system setting of the system configuration. In some embodiments, the controlling system configuration includes a configuration for the imaging device 216. The configuration for the imaging device 216 stores parameters such as position, zoom level and/or focus parameters (e.g., amount of focus, selecting autofocus or manual focus, and/or adjusting an autofocus target in an image). Imaging property parameters stored by the imaging device configuration include, e.g., image resolution, image size (e.g., image width and/or height), aspect ratio, pixel count, quality, focus distance, depth of field, exposure time, shutter speed, and/or white balance. In some embodiments, parameters stored by the imaging device configuration are updated in response to control instructions (e.g., generated by processor(s) 202 and/or received by the movable platform 102 from remote control 108 and/or the computing device 110). In some embodiments, parameters stored by the imaging device configuration are updated in response to information received from the movable platform sensing system 210 and/or the imaging device 216.

In some embodiments, a controlling system performs imaging device adjustment. The imaging device adjustment module stores, e.g., instructions for adjusting a distance between an image sensor and an optical device of an imaging device 216, e.g., instructions for controlling an imaging device actuator. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable platform 102 and/or an image subject (e.g., a target or a remote object) has moved by more than a threshold distance, and/or in response to user input. In some embodiments, user input (e.g., received at remote control 108 and/or computing device 110) initiates and/or adjusts an autofocus mode. In some embodiments, user input indicates one or more regions (e.g., in an image captured by imaging device 216, such as an image displayed by remote control 108 and/or computing device 110) to be used and/or prioritized for an autofocus operation. In some embodiments, the autofocus module generates control instructions for moving an optical device relative to an image sensor in accordance with an image distance value determined by an image distance determination module. In some embodiments, one or more instructions for performing an autofocus operation are stored in the memory 204.

In some embodiments, the controlling system performs image distance determination, e.g., to determine an object distance and/or an image distance in accordance with the operations described herein. For example, the image distance determination module uses sensor data from one or more depth sensors and one or more orientation sensors of a movable platform to determine an image distance and generate a control instruction for moving an optical device relative to an image sensor in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more processors 202 of the movable platform 102. In some embodiments, one or more of the above identified modules are stored on one or more storage devices of a device remote from the movable platform (such as memory of the remote control 108, the computing device 110, and/or the imaging device 216) and/or executed by one or more processors of a device remote from the movable platform 102 (such as processor(s) of the remote control 108, the computing device 110, and/or the imaging device 216).

The communication system 206 enables communication with the remote control 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable platform 102 from the remote control 108 and/or the computing device 110, or vice-versa. In some embodiments, communication is two-way communication, such that data is transmitted in both directions between the movable platform 102 and the remote control 108 and/or the computing device 110. In some embodiments, the movable platform 102, the remote control 108, and/or the computing device 110 are connected to the Internet 116 or other telecommunications network, e.g., such that data generated by the movable platform 102, the remote control 108, and/or the computing device 110 is transmitted to a server for data storage and/or data retrieval (e.g., for display by a website).

In some embodiments, the sensing system 210 of the movable platform 102 includes one or more sensors, as described further with reference to FIG. 3. In some embodiments, movable platform 102 and/or control unit 104 use sensing data generated by sensors of sensing system 122 to determine information such as a position of movable platform 102, an orientation of movable platform 102, movement characteristics of movable platform 102 (e.g., angular velocity, angular acceleration, translational velocity, translational acceleration and/or direction of motion along one or more axes), proximity of movable platform 102 to potential obstacles, weather conditions, locations of geographical features and/or locations of manmade structures.

Figure 2B:
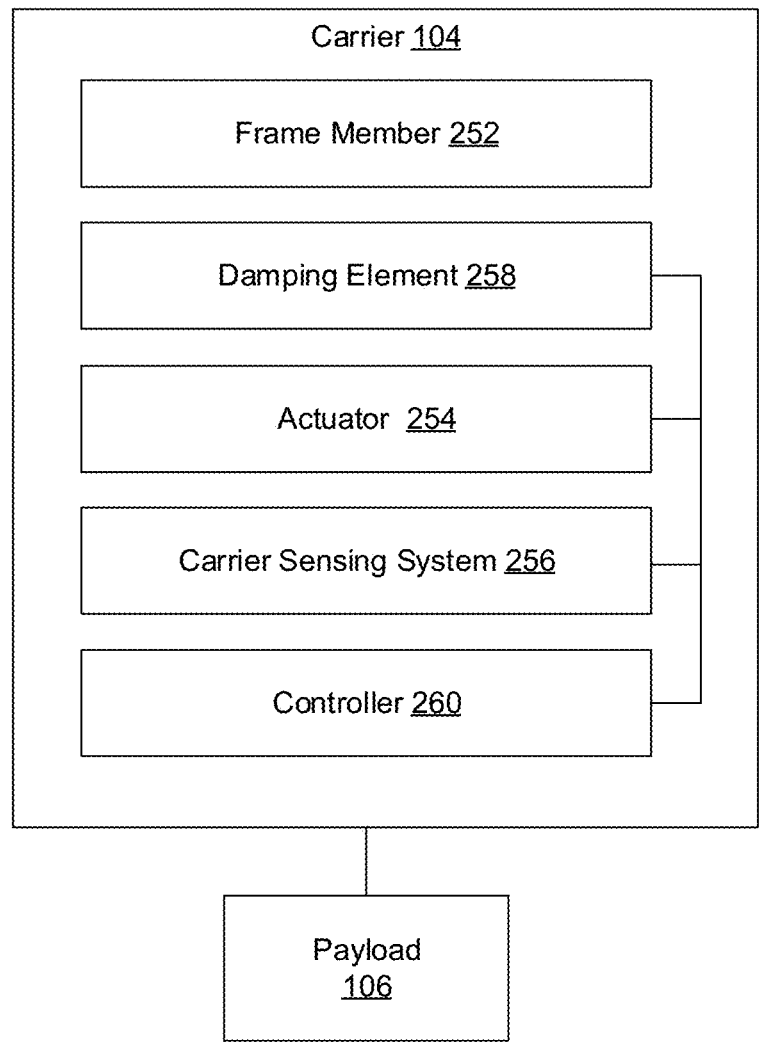
FIG. 2B illustrates an exemplary carrier of a movable platform, in accordance with embodiments.
Figure 2B:
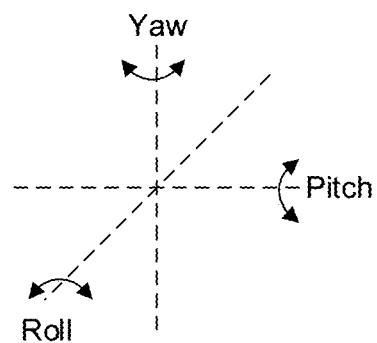

FIG. 2B illustrates an exemplary carrier 108 in a target tracking system 100, in accordance with embodiments. In some embodiments, carrier 108 couples a payload 106 to a movable platform 102.

In some embodiments, carrier 108 includes a frame assembly including one or more frame members 252. In some embodiments, frame member 252 is coupled with movable platform 102 and payload 106. In some embodiments, frame member 252 supports payload 106.

In some embodiments, carrier 108 includes one or more mechanisms, such as one or more actuators 254, to cause movement of carrier 108 and/or payload 106. Actuator 254 is, e.g., a motor, such as a hydraulic, pneumatic, electric, thermal, magnetic, and/or mechanical motor. In some embodiments, actuator 254 causes movement of frame member 252. In some embodiments, actuator 254 rotates payload 106 about one or more axes, such as three axes: X axis ("pitch axis"), Z axis ("roll axis"), and Y axis ("yaw axis"), relative to movable platform 102. In some embodiments, actuator 254 translates payload 106 along one or more axes relative to movable platform 102.

In some embodiments, carrier 108 includes one or more carrier sensing system 256, e.g., for determining a state of carrier 108 or payload 106. Carrier sensing system 256 includes, e.g., motion sensors (e.g., accelerometers), rotation sensors (e.g., gyroscopes), potentiometers, and/or inertial sensors. In some embodiments, carrier sensing system 256 includes one or more sensors of movable platform sensing system 210 as described below with regard to FIG. 3. Sensor data determined by carrier sensing system 256 includes, e.g., spatial disposition (e.g., position, orientation, or attitude) and/or movement information such as velocity (e.g., linear or angular velocity) and/or acceleration (e.g., linear or angular acceleration) of carrier 108 and/or payload 106. In some embodiments, sensing data and/or state information calculated from the sensing data are used as feedback data to control the movement of one or more components (e.g., frame member 252, actuator 254, and/or damping element 258) of carrier 108. Carrier sensor 206 is coupled to, e.g., frame member 252, actuator 254, damping element 258, and/or payload 106. In an embodiment, a carrier sensor 256 (e.g., a potentiometer) measures movement of actuator 254 (e.g., the relative positions of a motor rotor and a motor stator) and generates a position signal representative of the movement of the actuator 254 (e.g., a position signal representative of relative positions of the motor rotor and the motor stator). In some embodiments, data generated by a carrier sensor 256 is received by processor(s) 116 and/or memory 204 of movable platform 102.

In some embodiments, the coupling of carrier 108 to movable platform 102 includes one or more damping elements 258. Damping elements 258 are configured to reduce or eliminate movement of the load (e.g., payload 106 and/or carrier 108) caused by movement of movable platform 102. Damping elements 258 include, e.g., active damping elements, passive damping elements, and/or hybrid damping elements having both active and passive damping characteristics. The motion damped by the damping elements 258 can include one or more of vibrations, oscillations, shaking, or impacts. Such motions may originate from motions of movable platform that are transmitted to the load. For example, the motion may include vibrations caused by the operation of a propulsion system and/or other components of a movable platform 101.

In some embodiments, a damping element 258 provides motion damping by isolating the load from the source of unwanted motion by dissipating or reducing the amount of motion transmitted to the load (e.g., vibration isolation). In some embodiments, damping element 258 reduces the magnitude (e.g., amplitude) of the motion that would otherwise be experienced by the load. In some embodiments the motion damping applied by a damping element 258 is used to stabilize the load, thereby improving the quality of images captured by the load (e.g., image capturing device), as well as reducing the computational complexity of image stitching steps required to generate a panoramic image based on the captured images.

Damping element 258 described herein can be formed from any suitable material or combination of materials, including solid, liquid, or gaseous materials. The materials used for the damping elements may be compressible and/or deformable. For example, the damping element 258 is made of, e.g. sponge, foam, rubber, gel, and the like. For example, damping element 258 includes rubber balls that are substantially spherical in shape. The damping element 258 is, e.g., substantially spherical, rectangular, and/or cylindrical. In some embodiments, damping element 208 includes piezoelectric materials or shape memory materials. In some embodiments, damping elements 258 include one or more mechanical elements, such as springs, pistons, hydraulics, pneumatics, dashpots, shock absorbers, isolators, and the like. In some embodiments, properties of the damping element 258 are selected so as to provide a predetermined amount of motion damping. In some instances, the damping element 208 has viscoelastic properties. The properties of damping element 258 are, e.g., isotropic or anisotropic. In some embodiments, damping element 258 provides motion damping equally along all directions of motion. In some embodiments, damping element 258 provides motion damping only along a subset of the directions of motion (e.g., along a single direction of motion). For example, the damping element 258 may provide damping primarily along the Y (yaw) axis. In this manner, the illustrated damping element 258 reduces vertical motions.

In some embodiments, carrier 108 includes controller 260. Controller 260 includes, e.g., one or more controllers and/or processors. In some embodiments, controller 260 receives instructions from processor(s) 116 of movable platform 102. For example, controller 260 is connected to processor(s) 202 via control bus 208. In some embodiments, controller 260 controls movement of actuator 254, adjusts one or more parameters of carrier sensor 256, receives data from carrier sensor 256, and/or transmits data to processor 202.

Figure 2C:
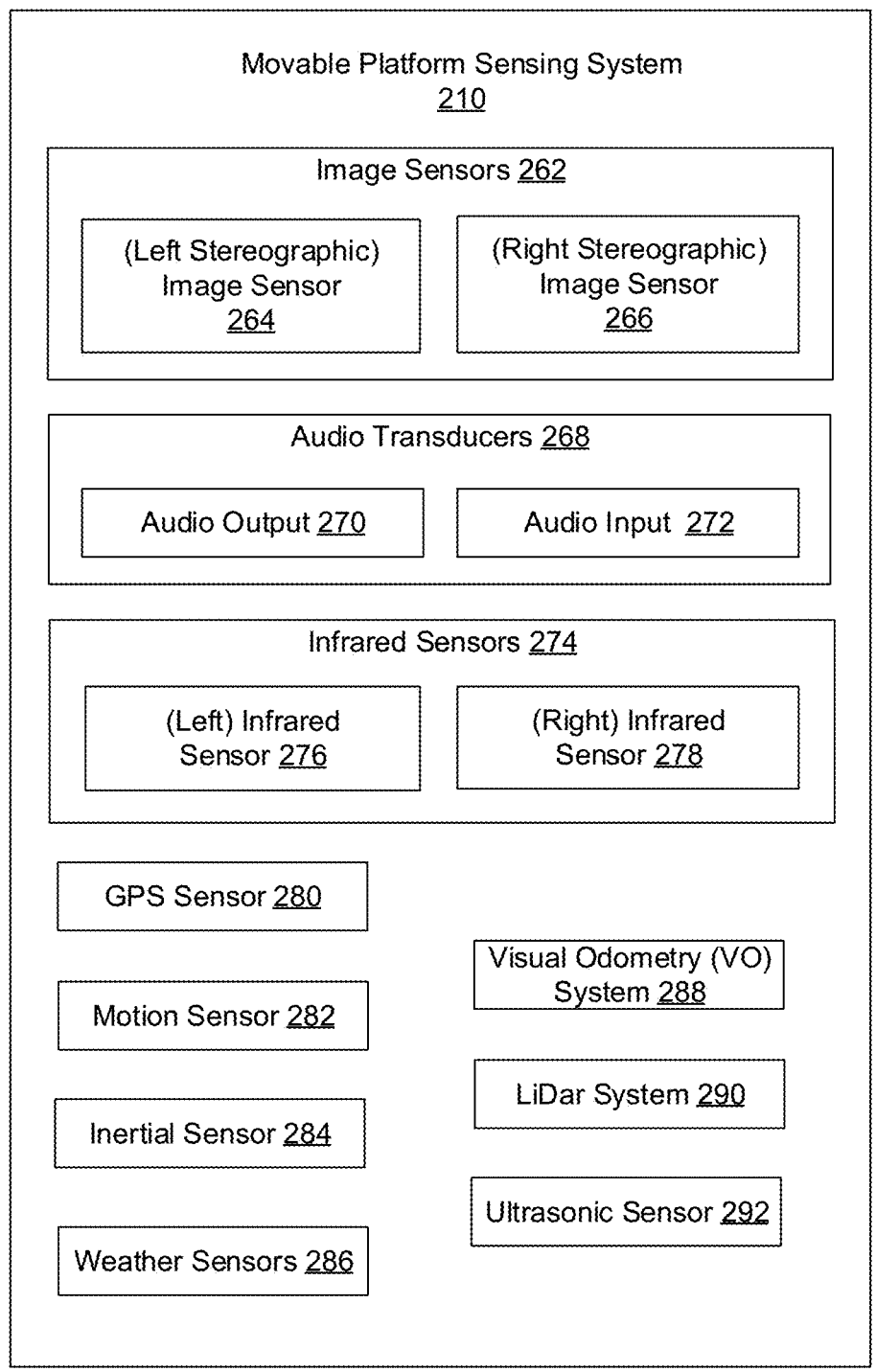
FIG. 2C illustrates an exemplary sensing system of a movable platform, in accordance with some embodiments.

FIG. 2C illustrates an exemplary sensing system 210 of a movable platform 102, in accordance with some embodiments. In some embodiments, one or more sensors of the movable platform sensing system 210 are mounted to the exterior, located within, or otherwise coupled to the movable platform 102. In some embodiments, one or more sensors of the movable platform sensing system 210 are components of and/or coupled to the carrier 104 (e.g., FIG. 2B), the payload 106, and/or the imaging device 216. Where sensing operations are described herein as being performed by the movable platform sensing system 210, it will be recognized that such operations are optionally performed by one or more sensors of the carrier 104, the payload 106, and/or the imaging device 216 in addition to and/or in lieu of one or more sensors of the movable platform sensing system 210.

Movable platform sensing system 210 generates static sensing data (e.g., a single image captured in response to a received instruction) and/or dynamic sensing data (e.g., a series of images captured at a periodic rate, such as a video).

In some embodiments, movable platform sensing system 210 includes one or more image sensors 262. In some embodiments, the one or more image sensors 262 include a plurality of stereoscopic cameras, such as a pair of stereoscopic cameras including a left stereographic image sensor 264 and a right stereographic image sensor 266. The image sensors 262 capture images, image streams (e.g., videos), stereographic images (e.g., stereoscopic images), and/or stereographic image streams (e.g., stereoscopic videos). In some embodiments, the image sensors 262 include multiple pairs of stereoscopic cameras located at different parts (e.g., sides, areas, etc.) of the movable platform 102, such as one or more parts of the top part, bottom part, front part, back part, left part, and right part of the movable platform 102. For example, movable platform sensing system 210 includes a pair of stereoscopic cameras located at the front of the movable platform 102, another pair of stereoscopic cameras at the back of the movable platform 102, and yet another pair of stereoscopic cameras at the bottom of the movable platform 102. Image sensors 262 detect light, such as visible light, infrared light, and/or ultraviolet light. In some embodiments, movable platform sensing system 210 includes one or more optical devices (e.g., lenses) to focus or otherwise alter the light onto one or more image sensors 262. In some embodiments, image sensors 262 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors.

In some embodiments, movable platform sensing system 210 includes one or more audio transducers 268. For example, an audio detection system includes audio output transducer 270 (e.g., a speaker), and audio input transducer 272 (e.g. a microphone, such as a parabolic microphone). In some embodiments, microphone and a speaker are used as components of a sonar system. In some embodiments, a sonar system is used to detect current location information of an object (e.g., an obstacle and/or a target) in the environment.

In some embodiments, movable platform sensing system 210 includes one or more infrared sensors 274. In some embodiments, a distance measurement system includes a pair of infrared sensors, e.g., infrared sensor 276 (such as a left infrared sensor) and infrared sensor 278 (such as a right infrared sensor) or another sensor or sensor pair. The distance measurement system can be used to measure a distance to an object in the environment (e.g., a target and/or an obstacle).

In some embodiments, a system to produce a disparity map includes one or more sensors or sensor pairs of movable platform sensing system 210 (such as left stereographic image sensor 264 and right stereographic image sensor 266; audio output transducer 270 and audio input transducer 272; and/or left infrared sensor 276 and right infrared sensor 278. In some embodiments, a pair of sensors in a stereo data system (e.g., a stereographic imaging system) simultaneously captures data from different positions. In some embodiments, a depth map is generated by a stereo data system using the simultaneously captured data. In some embodiments, a depth map is used for positioning and/or detection operations, such as detecting an obstacle, detecting current location information of an obstacle, detecting a target, and/or detecting current location information for a target. In some embodiments, movable platform sensing system 210 includes one or more depth sensors, such as time-of-flight (TOF) cameras. For example, movable platform sensing system 210 includes TOF cameras located at left and right sides of the movable platform 102. One or more TOF cameras may also locate other parts of the movable platform 102. A TOF camera calculates a distance of each point/pixel in an image frame based on the speed of light. For example, the time-of-flight of a light signal between the imaging system and the subject for a pixel in the image frame is measured to determine the distance (e.g., depth) of the corresponding pixel.

In some embodiments, movable platform sensing system 210 further includes, but is not limited to, one or more global positioning system (GPS) sensors 280, motion sensors (e.g., accelerometers) 282, rotation sensors (e.g., gyroscopes), inertial sensors 284, proximity sensors (e.g., infrared sensors) and/or weather sensors 286 (e.g., pressure sensor, temperature sensor, moisture sensor, and/or wind sensor), visual odometry (VO) system 288, Lidar system 290, and ultrasonic sensor 292. In some embodiments, the movable platform sensing system 210 includes an inertial measurement unit (IMU) that may include the motion sensors 282, the rotation sensors, and optionally magnetometers.

In some embodiments, sensing data generated by one or more sensors of movable platform sensing system 210 and/or information determined using sensing data from one or more sensors of movable platform sensing system 210 are transmitted to remote control 108 (e.g., via communication system 206). In some embodiments, data generated one or more sensors of movable platform sensing system 210 and/or information determined using sensing data from one or more sensors of movable platform sensing system 122 is stored by memory 204.

FIGS. 3A and 3B illustrate a process for preparing an exemplary 2-dimensional mask 320 from a predefined 3-dimensional space 300 (also referred to as 3-dimensional volume 300), in accordance with some embodiments. In some embodiments, an image sensor 302 of the movable platform 102, such as the left stereographic image sensor 264 and/or the right stereographic image sensor 266 of the movable platform sensing system 210 or the imaging device 216, has a valid detection range corresponding to a predefined range (e.g., a predefined 3-dimensional space) within which the image data, e.g., disparity information, of the object(s) are more accurately captured by the image sensor 302. In some embodiments, the valid detection range of the image sensor 302 along the Z dimension in FIG. 3A is between 0.5 meters to 15 meters. Due to a limitation of the shooting angle of the image sensor 302, the 3-dimensional space 300 also has limitations along the X and Y dimensions. In some embodiments, the valid detection range can be represented using a predefined 3-dimensional space 300, e.g., a cuboid ABCDEFGH, located along the movement trajectory of the movable platform 102 (or the image sensor 302). In some embodiments, the cuboid ABCDEFGH has a dimension of 10 m×10 m×15 m as shown in FIG. 3A. In some embodiments, the 3-dimensional space 300 can be represented using other suitable shapes (not shown) including, but not limited to, a cylinder, a sphere, or a cone.

In some embodiments, an electronic device (e.g., the computing device 110, the remote control 108, or the movable platform 102, FIG. 1) obtains a 2-dimensional mask 350, as shown in FIG. 3B. In some embodiments, the 2-dimensional mask 350 is obtained by projecting the 3-dimensional volume 300 onto a 2-dimensional plane. The points A', B', C', D', E', F', G', and H' on the 2-dimensional mask 350 correspond to projections of the points A, B, C, D, E, F, G, and H from the 3-dimensional volume onto the 2-dimensional plane respectively. Each point of the points A', B', C', D', E', F', G', and H' on the 2-dimensional mask 350 has a threshold value determined by disparity values for objects located at points A, B, C, D, E, F, G, and H respectively in the 3-dimensional volume. As for other points on the 2-dimensional mask, each also has a threshold value determined by a disparity value of an object located at a corresponding location of the 3-dimensional volume 300. In some embodiments, the threshold values on the 2-dimensional mask 350 define the minimum disparity values (corresponding to one or more farthest distances in the world coordinate system) for selecting objects within the valid detection range (e.g., the 3-dimensional volume 300) of the image sensor 302.

In some embodiments, the threshold values of such points are determined by projecting the points on the boundaries (e.g., including on the planes EFGH, EFBA, FBCG, DHGC, ADHE, and ABCD, and the edges of these planes) of the 3-dimensional volume 300 onto the 2-dimensional mask 350 to identify the disparity values at the corresponding points. In some other embodiments, the threshold values of the points on the 2-dimensional mask 350 are obtained by (1) determining disparity values of points corresponding to points on the edges of the 3-dimensional volume; and (2) estimating disparity values of other points at locations other than on the edges using a recurrence relation. For example, after determining the disparity values of points on edges EF and FB, BA, and AE, a threshold value of a point within the region A'E'F'B' is estimated using a linear recurrence relation based on the threshold values of points on E'F' and F'B', B'A', and A'E'.

In one example as shown in FIGS. 3A-3B, a point I (e.g., an object located at the location I) located on the plane ABFE of the 3-dimensional volume 300 corresponds to point I' within the region A'B'F'E' of the 2-dimensional mask 350, and the threshold value of point I' is determined by the disparity value for an object located at the point I. In another example, a point J located within the body of the 3-dimensional volume 300 (e.g., point J is located between planes ABCD and EFGH, between planes ADHE and BCGF, and between planes ABFE and DCJH) can be projected by the image sensor 302 onto point K which is located on the plane EFGH. Point K of the 3-dimensional volume 300 corresponds to point K' on the 2-dimensional mask 350. Accordingly, the threshold value of K' on the 2-dimensional mask 350 is determined by the disparity value for an object located at the point K. It is noted that disparity value of point K may or may not be the same as the disparity values of point E, F, G, or H, depending on the orientation of the image sensor 302.

Figure 3C:
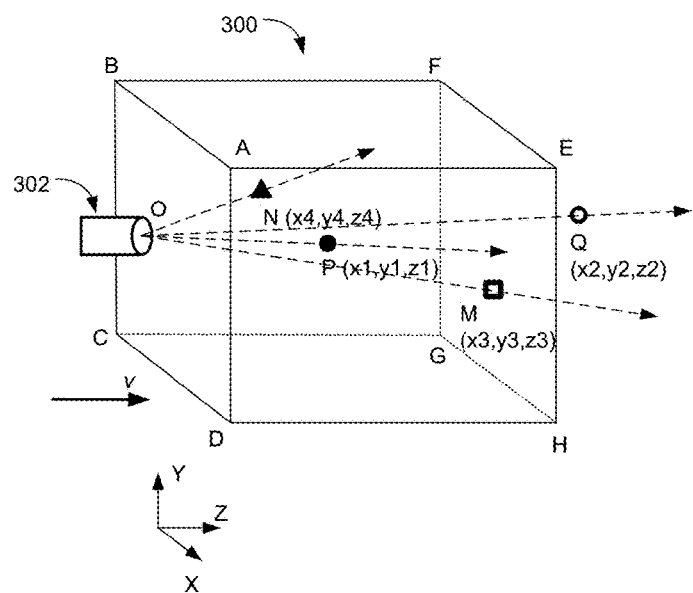
FIGS. 3C and 3D illustrate a process for using an exemplary 2-dimensional mask for selecting a disparity map, in accordance with some embodiments.
Figure 3D:
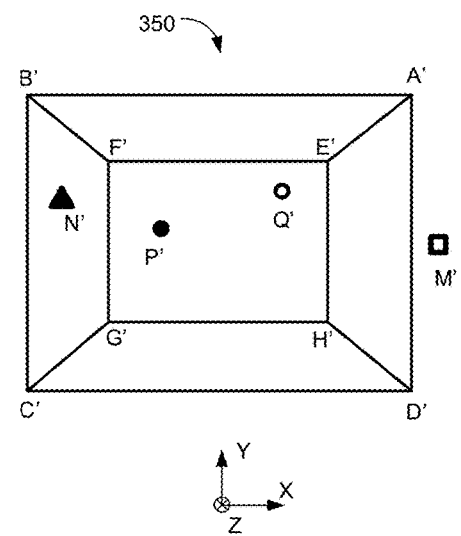

FIGS. 3C and 3D illustrate a process for using an exemplary 2-dimensional mask 350 for selecting (or filtering) a disparity map, in accordance with some embodiments. In some embodiments, the movable platform sensing system 210, such as left stereographic image sensor 264 and right stereographic image sensor 266, are used to capture a pair of stereoscopic grayscale images respectively. A disparity map can be generated based on the pair of stereoscopic grayscale images. In some embodiments, the disparity map includes points P, Q, M, and N which are to be evaluated using the 2-dimensional mask 350. In some examples, the disparity map is generated using semi-global block-matching (SGBM) algorithm or any other suitable processes. The disparity map includes disparity values of one or more pixels. A disparity value corresponds to a spatial difference between two locations of a single pixel (or a single point) of an object located on the left and right stereoscopic images respectively. The disparity value is related to depth information of a pixel (e.g., a distance between the object and the imaging sensor). The disparity map can be used for obtaining depth information, e.g., information related to a distance between the camera(s) and the object, of one or more objects in the image frames. In some embodiments, an electronic device (e.g., the computing device 110, the remote control 108, or the movable platform 102, FIG. 1) processes the disparity map to select pixels within a more accurate range corresponding to the valid detection range of the image sensors.

In some embodiments, the electronic device selects, among the disparity map, a subset of elements (e.g., one or more points or one or more pixels) with respective disparity values using the 2-dimensional mask 350. In some embodiments, the subset of elements are selected by comparing the respective disparity values of the elements with the threshold disparity values on the 2-dimensional mask that correspond to projections of the elements onto the 2-dimensional mask. The subset of elements represents actual objects within the predefined 3-dimensional volume 300. In some embodiments, elements (such as pixels) on the disparity map having disparity values lower than the threshold values are excluded when processing the disparity map. In some embodiments, when selecting the disparity map using the 2-dimensional mask 350, a 3-dimensional volume 300 is put (e.g., virtually) relative to the image sensor 302 in the space as shown in FIG. 3C. The image sensor 302 is located adjacent or near (e.g., when a minimum valid detection distance is used) the plane ABCD of the 3-dimensional volume 300. A point from the disparity map is projected from the coordinate system associated with the 3-dimensional volume 300 onto the 2-dimensional mask 350 to identify a corresponding point on the 2-dimensional mask 350. The disparity value of this point on the disparity map is then compared with the threshold value of the projection point on the 2-dimensional mask 350 to determine whether to include or exclude this point in the valid disparity map for further processing (e.g., for object detection and/or object tracking).

In one example as shown in FIGS. 3C and 3D, a pixel (or point) P from the disparity map is located within the 3-dimensional volume 300 (FIG. 3C). Pixel P is projected to point P' located on the 2-dimensional mask 350 (FIG. 3D). For example, the coordinate x1 is within the plane boundaries of ADHE and BCGF, the coordinate y1 is within the plane boundaries of AEFB and DHGC, and the depth coordinate z1 is within the plane boundaries ABCD and EFGH. In some embodiments, it is determined that the disparity value of P in the disparity map is greater than the threshold value at P' on the 2-dimensional mask 350. (As discussed above with reference to FIGS. 3A and 3B, the threshold value at P' is determined by a disparity value of an intersection point between the plane EFGN and the projection line OP, the intersection point located farther away from the image sensor 302 compared to point P on the projection line OP.) Thus, point P is selected to be included in the valid disparity map.

In another example, a point (or pixel) Q from the disparity map is located outside the 3-dimensional volume 300. For example, the depth coordinate z2 of pixel Q is outside the plane boundary EFGH. Pixel Q is projected to the point Q' located behind the 2-dimensional mask 350. In some embodiments, a disparity value of Q (in the 3-dimensional volume 300) is lower than the threshold value at Q' (because the threshold value at Q' is determined by a disparity value of an intersection point between the plane EFGN and the projection line OQ, such intersection point located nearer to the image sensor 302 compared to Q on the projection line OQ). Thus, point Q is excluded from the valid disparity map.

In yet another example, a point (or pixel) M located on the right of the 3-dimensional volume 300 (e.g., coordinate x3 is outside the plane ADHE) is projected to the point M' located outside the 2-dimensional mask 350. Without having to compare the disparity value against any threshold value on the 2-dimensional mask 350, point M is excluded from the valid disparity.

In yet another example, a point (or pixel) N located within the 3-dimensional volume 300 is projected to point N' located within region B'F'C'G' of the 2-dimensional mask 350. The threshold value of point N' may be determined by an intersection point between the projection line ON and the plane BCGF. Thus the disparity value of point N is greater than the threshold value of point N, and point N is selected to be included on the valid disparity map.

In some embodiments, the electronic device further excludes a region from the disparity map corresponding to the ground within the movement trajectory of the movable platform 102. The region corresponding to the ground may be determined in the disparity map based on spatial information, such as height and/or attitude data, of the movable platform 102. Accordingly, the corresponding region in the image is also identified and excluded from further processing, such that the movable platform 102 will not take the ground as an object for tracking.

As such, the electronic device identifies one or more objects from the processed (e.g., the filtered, valid) disparity map based on the comparison results of the disparity values against the threshold values of corresponding points on the 2-dimensional mask 350. The electronic device determines distances between the identified objects and the image sensor(s). The processed disparity map is used for object detection and/or object tracking for the movable platform 102 as discussed below.

Figure 4A:
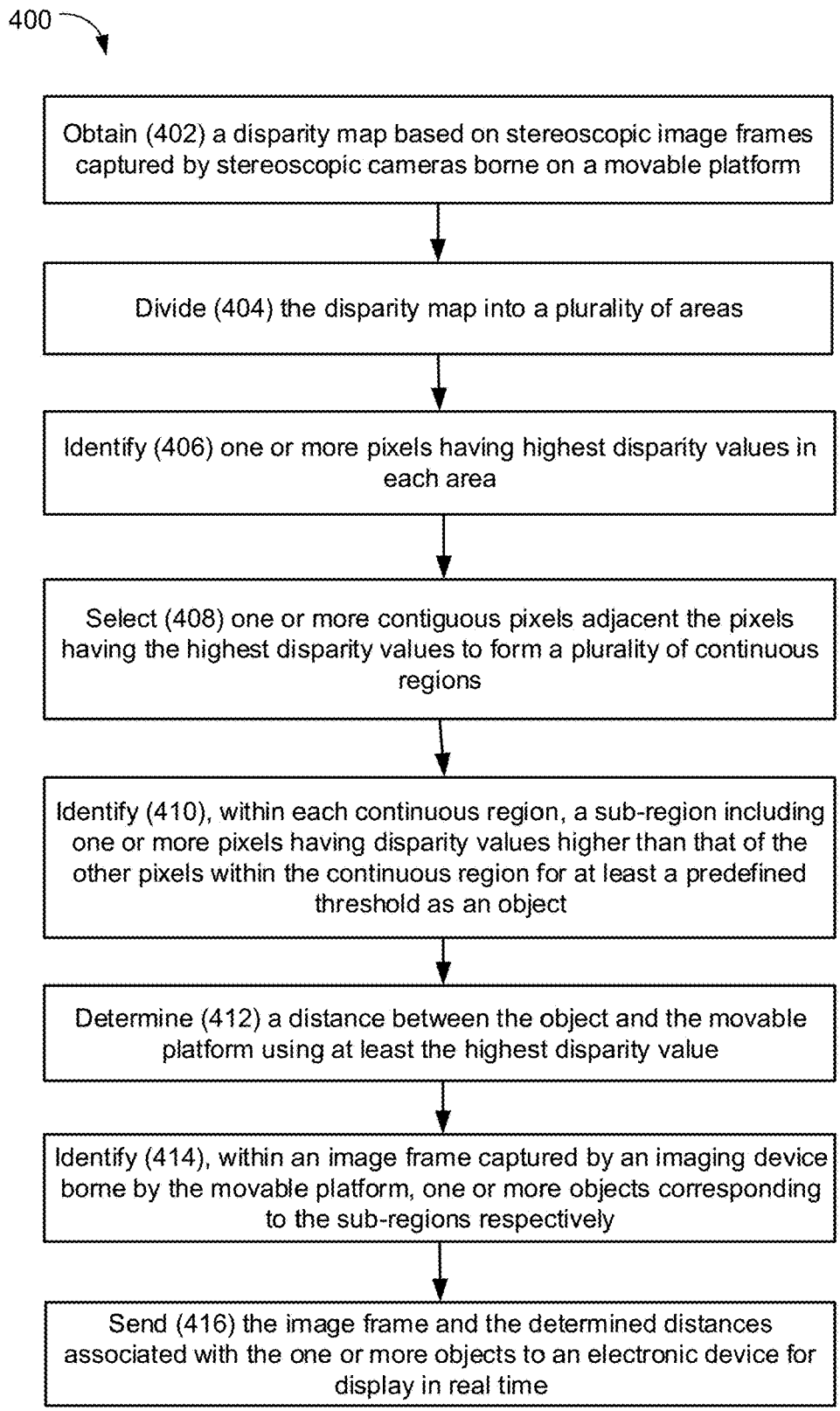
FIG. 4A is a diagram illustrating a method of processing image data including disparity depth map to detect objects when a movable platform is in a static-hover mode, in accordance with some embodiments.
Figure 4B:
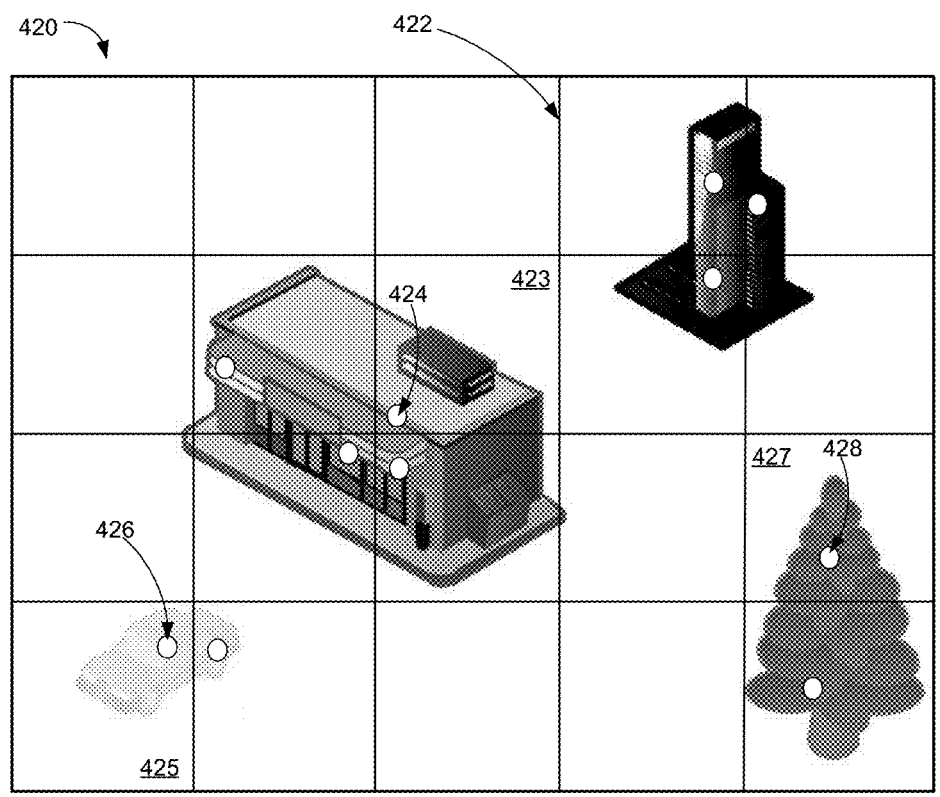
FIGS. 4B and 4C illustrate exemplary processes of processing disparity map for detecting objects in disparity maps when a movable platform is in a static-hover mode, in accordance with some embodiments.
Figure 4C:
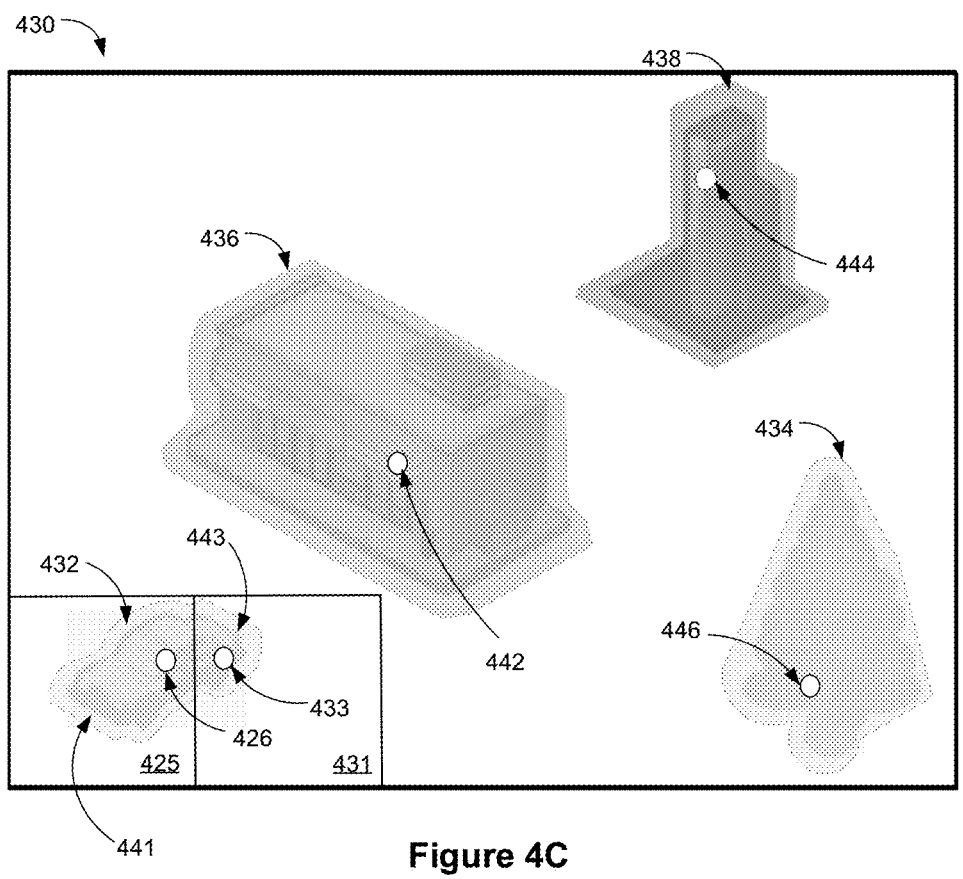

FIG. 4A is a diagram illustrating a method 400 of processing image data including disparity depth map to detect one or more objects when the movable platform 102 is in a static-hover mode, in accordance with some embodiments. In some embodiments, method 400 is performed by an electronic device such as the computing device 110, the remote control 108, or the movable platform 102 (FIG. 1). For example, method 400 is performed by a controller of the image sensors 262, a controller of the imaging device 216, a controller of the movable platform 102, or a controller of the remote control 108. In some other embodiments, method 400 is performed by other electronic device(s), such as a mobile device or a computing device paired with the remote control 108 for operating the movable platform 102. Operations performed in FIG. 4A correspond to instructions stored in computer memories or other computer-readable storage mediums of the corresponding device(s). FIGS. 4B and 4C illustrate exemplary processes of processing disparity map for detecting one or more objects when the movable platform 102 is in a static-hover mode, in accordance with some embodiments. One or more steps of method 400 are further illustrated in FIGS. 4B and 4C, which are discussed in combination with FIG. 4A in the present disclosure.

In some embodiments, the electronic device obtains (402) a disparity map, such as disparity map 420 in FIG. 4B. The disparity map 420 is obtained based on stereoscopic image frames captured by stereoscopic cameras (left stereographic image sensor 264 and right stereographic image sensor 266) borne on the movable platform 102. In some embodiments, the movable platform 102 statically hovers at a certain height. In some embodiments, the disparity map 420 is selected (e.g., pre-processed) using the 2-dimensional mask 350 as discussed with reference to FIGS. 3A-3B. Only disparity map within the valid detection range of the stereoscopic imaging sensors is selected. Each point on the disparity map 420 is projected to the 2-dimensional mask 350, and the disparity values of points on the disparity map 420 are compared with the threshold values of corresponding points on the 2-dimensional mask 350. Pixels with disparity values lower than the corresponding predefined threshold values are excluded from the valid disparity map.

As shown in FIG. 4B, method 400 proceeds to divide (404) the disparity map 420 into a plurality of areas, e.g., using a grid 422. For example, the disparity map 420 is divided evenly into 5×4 areas. Method 400 proceeds to identify (406), in each area, one or more pixels having highest disparity values (e.g., a correlated point of an object being closest to the imaging sensors) within the valid detection range, such as pixel 424 in area 423, pixel 426 in area 425, and pixel 428 in area 427. In some embodiments, within each area, a distance between each point of an object and the movable platform 102 is calculated based on a disparity value of a pixel in the disparity map that correlates to the point of the object. The distances are further ranked from the lowest disparity value towards the highest disparity value.

As shown in FIG. 4C, method 400 proceeds to select (408) one or more contiguous pixels adjacent the pixels having the highest disparity values in each area to form a continuous region, such as a continuous region 432 including a plurality of pixels adjacent the pixel 426 having the highest disparity value. A plurality of continuous regions, such as regions 432, 434, 436, and 438, can thus be selected in the disparity map 430. In some embodiments, the pixels within a continuous region correlate to respective points in the world coordinate system having distances to the point closest to the imaging device within a predefined range. In some examples, because a difference of disparity values between two pixels can be used for calculating a distance between two points correlated to the two pixels respectively in the world coordinate system, the one or more contiguous pixels adding up to a continuous region are selected to have disparity values with differences with the highest disparity value that are within a predefined range. In one example, a continuous region includes a plurality of pixels correlated to respective points in the world coordinate system that have distances to the closest point (correlated to the pixel having the highest disparity value) for less than 0.5 meter. In some embodiments, a continuous region, e.g., continuous region 432, extends across multiple contiguous areas (such as area 425 and area 431) and covers multiple pixels with highest disparity values (such as pixel 426 and pixel 433 respectively). In some embodiments, two sub-continuous regions, e.g., sub-continuous regions 441 and 443, are identified based on respective pixels, e.g., pixel 426 and pixel 433, having the highest disparity values in corresponding areas, e.g., areas 425 and 431. When the two sub-continuous regions extend over respective areas, e.g., area 425 and 431, and overlap, the two sub-continuous regions (e.g., sub-continuous regions 441 and 443) are connected to form a single continuous region 432 as shown in FIG. 4C. A plurality of continuous regions can be selected as shown in the disparity map 430 in FIG. 4C.

Method 400 proceeds to identify (410), within each continuous region, a sub-region including one or more pixels having disparity values higher than that of the other pixels within the continuous region for at least a predefined threshold as an object. The sub-region is identified as an object detected by the movable platform 102. In some embodiments, the electronic device identifies a sub-region, such as a pixel having the highest disparity value (i.e., being closest to the imaging sensors) in the continuous region. For example, as shown in FIG. 4C, pixel 442 is detected as an object in continuous region 436, pixel 444 is detected as an object in continuous region 438, pixel 446 is detected as an object in continuous region 434, and pixel 426 is detected as an object in continuous region 432. In some embodiments, the object is an obstacle or a portion of the obstacle for avoidance by the movable platform. In some embodiments, the object is a target or a portion of the target for tracking by the movable platform.

Method 400 proceeds to determine (412) a distance between the identified object (e.g., the sub-region, or the pixel having the highest disparity value) in each continuous region and the movable platform 102. In some embodiments, the distance is determined using at least the highest disparity value of the object. In some embodiments, the distance is also determined using one or more parameters of the imaging sensors, such as a focal length of the imaging sensors.

Figure 4D:
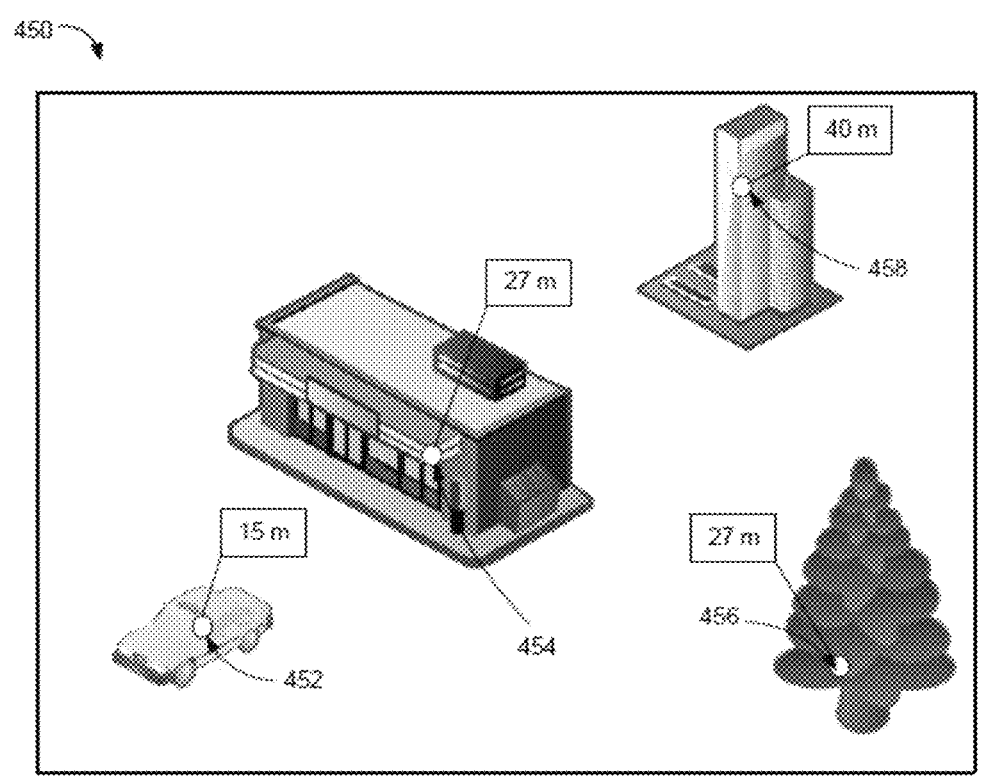
FIG. 4D illustrates an exemplary image frame captured by the imaging device borne on the movable platform, in accordance with some embodiments.

In some embodiments, the imaging device 216 borne on the movable platform 102 captures one or more image frames when the movable platform 102 hovers at a certain height or moves along a navigation path. Method 400 proceeds to identify (414), within an image frame captured by the imaging device 216 borne on the movable platform 102, one or more objects corresponding to the sub-regions respectively. FIG. 4D illustrates an exemplary image frame 450 captured by the imaging device 216 borne on the movable platform 102. In some embodiments, the one or more objects (e.g., pixels 452, 454, 456, and 458) corresponding to the sub-regions identified in the disparity map 430 at step 410 are identified on the image frame 450. In some embodiments, the sub-regions in the disparity map 430 are projected to respective objects or pixels in the image frame 450 based on spatial information of the movable platform 102 and spatial information of the imaging device 216. For example, data from IMU and GPS and data from gimbal for carrying the imaging device are used for calculating and identifying the objects or pixels in the image frame 450. In some embodiments, characteristic points and/or object matching algorithms are also used for identifying the objects/pixels in the imaging frame 450 that correspond to the sub-regions.

Method 400 proceeds to send (416) the image frame 450 and the determined distances associated with the one or more objects to an electronic device for display. In some embodiments as shown in FIG. 4D, the respective distances associated with the objects are displayed in real time.

Figure 5A:
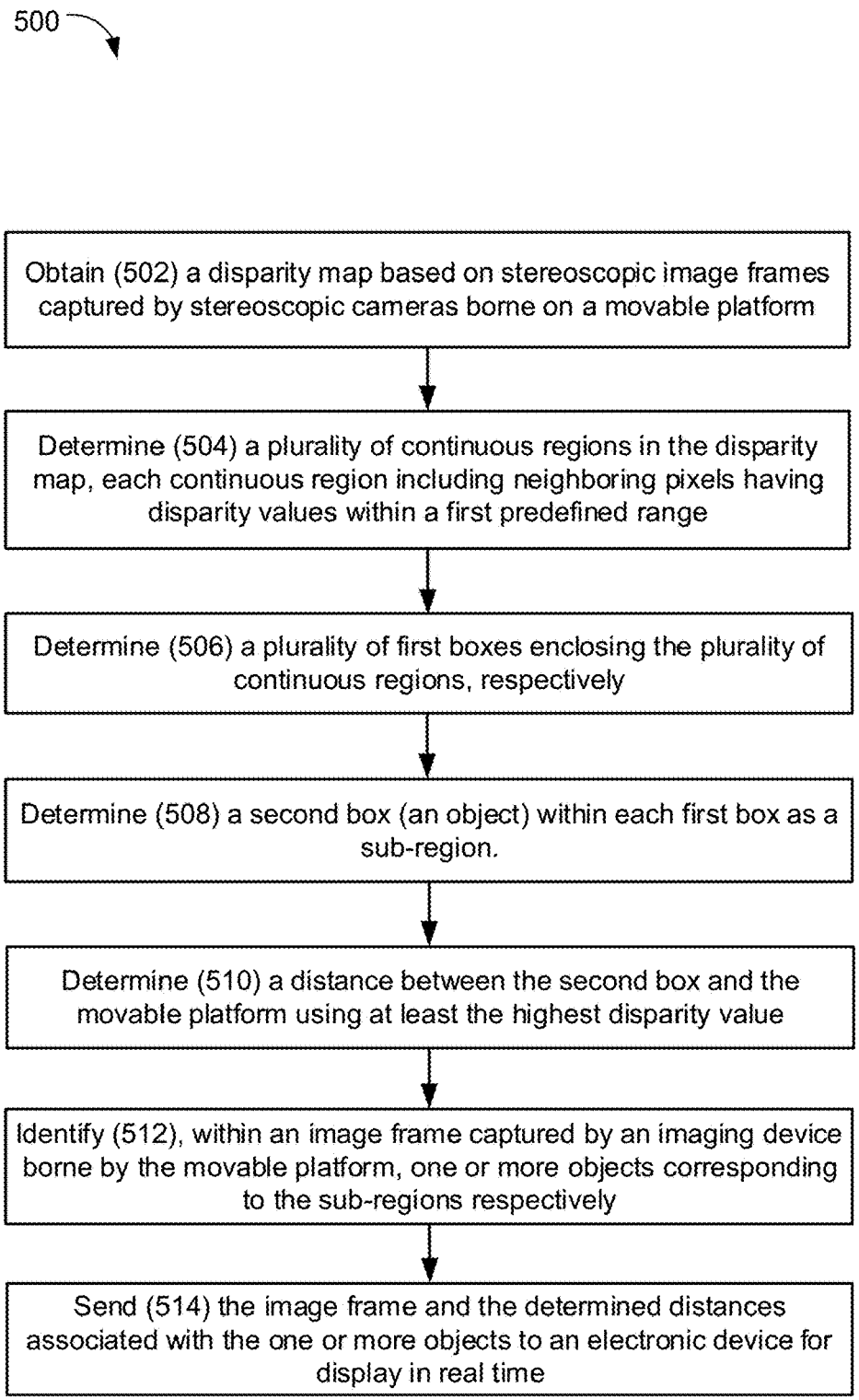
FIG. 5A is a diagram illustrating a method of processing image data including disparity map to detect objects when a movable platform is in an in-flight mode, in accordance with some embodiments.
Figure 5B:
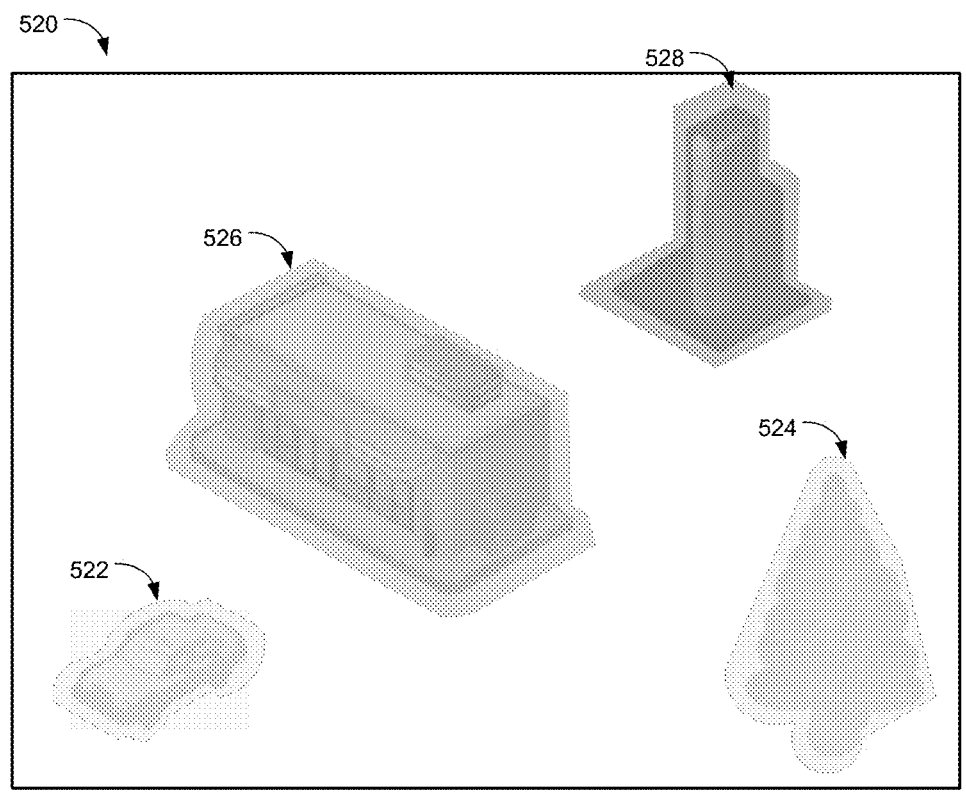
FIGS. 5B-5D illustrate exemplary processes of processing disparity map for detecting objects when a movable platform is in an in-flight mode, in accordance with some embodiments.
Figure 5C:
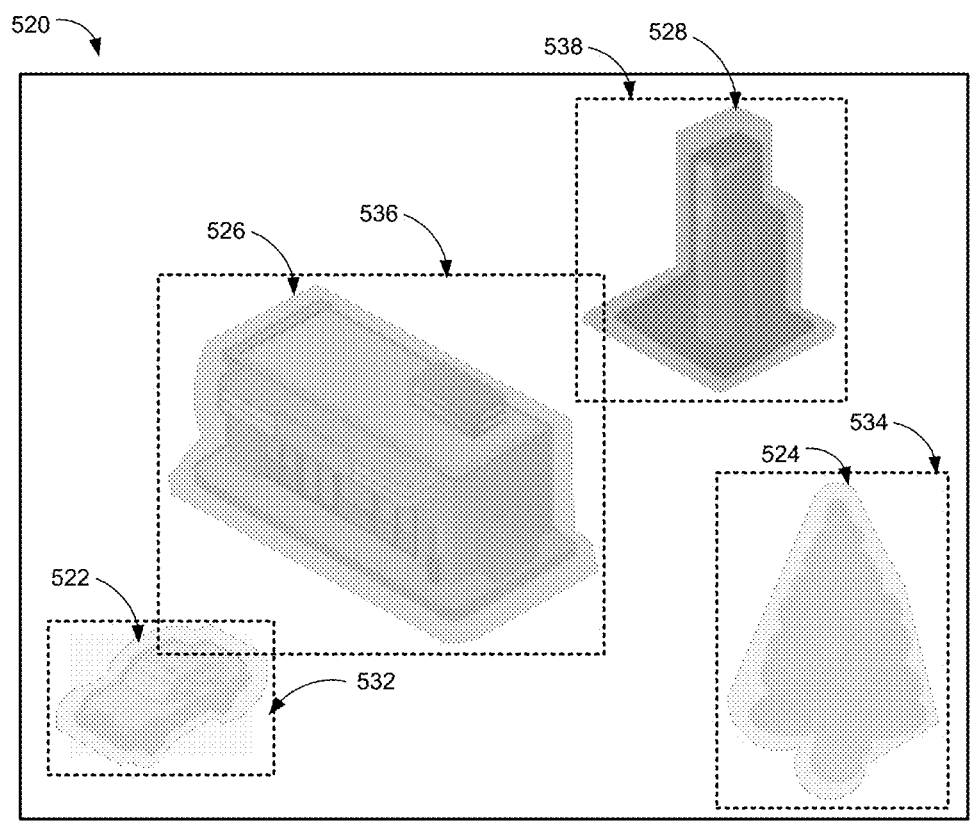
Figure 5D:
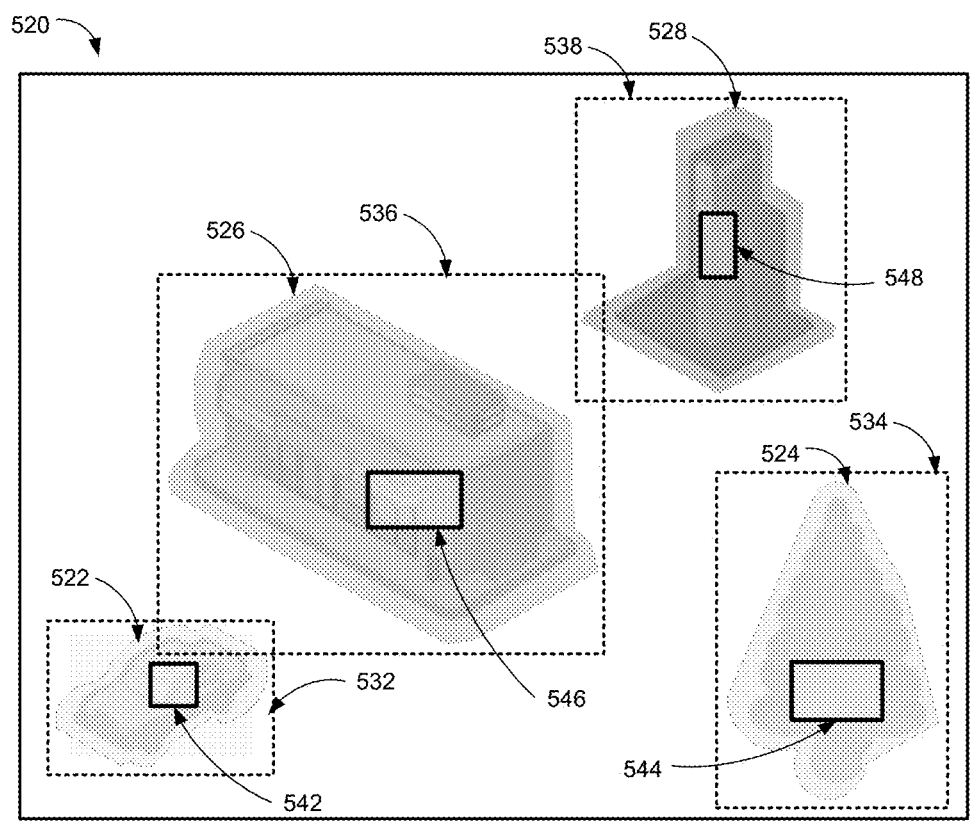

FIG. 5A is a diagram illustrating a method 500 of processing image data including disparity map to detect objects when the movable platform 102 is in an in-flight mode, in accordance with some embodiments. In some embodiments, method 500 is performed by an electronic device such as the computing device 110, the remote control 108, or the movable platform 102 (FIG. 1). For example, method 500 is performed by a controller of the image sensors 262, a controller of the imaging device 216, a controller of the movable platform 102, or a controller of the remote control 108. In some other embodiments, method 500 is performed by other electronic device(s), such as a mobile device or a computing device paired with the remote control 108 for operating the movable platform 102. Operations performed in FIG. 5A correspond to instructions stored in computer memories or other computer-readable storage mediums of the corresponding device(s). FIGS. 5B-5D illustrate exemplary processes of processing disparity map for detecting objects when a movable platform is in an in-flight mode, in accordance with some embodiments. One or more steps of method 500 are further illustrated in FIGS. 5B-5D, which are discussed in combination with FIG. 5A in the present disclosure.

In some embodiments, the electronic device obtains (502) a disparity map, such as disparity map 520 in FIG. 5B. The disparity map 520 is obtained based on stereoscopic image frames captured by stereoscopic cameras (left stereographic image sensor 264 and right stereographic image sensor 266) borne on the movable platform 102. In some embodiments, the movable platform 102 is in an in-flight mode. For example, the movable platform 102 moves along a navigation path. In some embodiments, the disparity map is selected (e.g., pre-processed) using the 2-dimensional mask 350 as discussed with reference to FIGS. 3A and 3B. Only disparity map within the valid detection range of the stereoscopic imaging sensors is selected. Disparity values of the disparity map are compared with the 2-dimensional mask 350 to exclude pixels with disparity values lower than the corresponding predefined threshold values on the 2-dimensional mask.

As shown in FIG. 5B, method 500 proceeds to determine (504) a plurality of continuous regions (e.g., continuous regions 522, 524, 526, and 528) in the disparity map 520. In some embodiments, each continuous region is determined to include neighboring pixels having disparity values within a first predefined range. For example, a disparity value difference between any neighboring pixels within a continuous region is no higher than 2 pixels.

In some embodiments, the determined continuous regions are irregular. As shown in FIG. 5C, method 500 proceeds to determine (506) a plurality of first boxes enclosing the plurality of continuous regions respectively. In some embodiments, the first boxes are in a regular shape, such as rectangular, such as boxes 532, 534, 536, and 538 shown in FIG. 5C.

Method 500 proceeds to determine (508) a second box (an object) within each first box determined at step 506 as a sub-region. For example, as shown in FIG. 5D, the electronic device determines the second boxes 542, 544, 546, and 548, within the first boxes 532, 534, 536, and 538. Each second box encloses one or more pixels with disparity values within a second predetermined range. For example, each second box includes one or more pixels having the highest disparity values in the corresponding first box. That is, each second box represents a portion of the first box that is closest to the movable platform 102. In some embodiments, each second box is centered at a pixel having the highest disparity value in the corresponding first box. In some embodiments, each second box includes pixels having disparity values in a range of x %-100% (e.g., x=80%, 70%, 60%, 50%) of the highest disparity value in the corresponding first box. In one example, in order to identify the second boxes, a pixel having the highest disparity value (Dmax) and a pixel having the lowest disparity value (Dmin) within each first box are identified. Centered at the pixel having the highest disparity value, the second box is determined to include a continuous region having pixels with minimum disparity values of (Dmax+Dmin)/2. In some embodiments, each second box encloses a continuous region and is in a regular shape, such as rectangular shape. In some alternative embodiments, a sub-region is a circle that is (1) centered at the pixel having the highest disparity value and (2) having a radius of (Dmax+Dmin)/2. In some other embodiments, the sub-region encloses the pixel with Dmax but does not have to be centered at the pixel with Dmax. For example, the sub-region is identified as a rectangular region having a diagonal of (Dmax+Dmin)/2 or Dmax. The sub-region is identified as an object detected by the movable platform 102. In some embodiments, the object is an obstacle or a portion of the obstacle for avoidance by the movable platform. In some embodiments, the object is a target or a portion of the target for tracking by the movable platform.

Method 500 proceeds to determine (510) a distance between the second box (e.g., the identified object) and the movable platform 102. In some embodiments, the distance is determined using at least the highest disparity value of the object. In some embodiments, the distance is also determined using one or more parameters of the imaging sensors, such as a focal length of the imaging sensors.

Figure 5E:
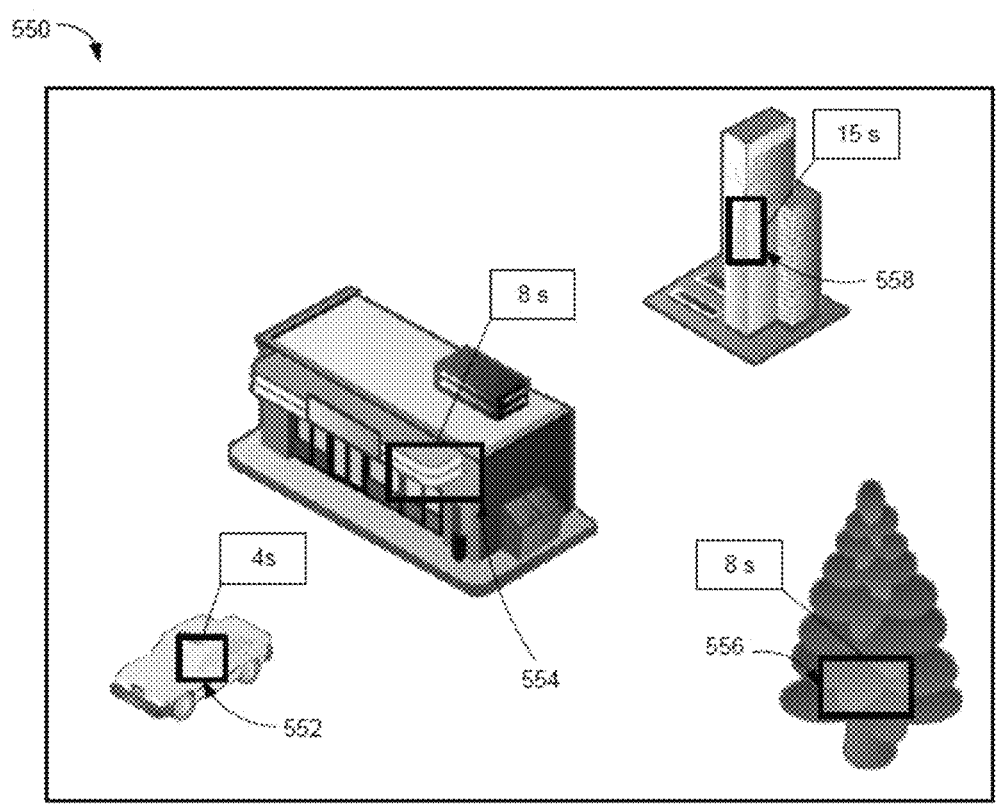
FIG. 5E illustrates an exemplary image frame captured by the imaging device borne on the movable platform, in accordance with some embodiments.

In some embodiments, the imaging device 216 borne on the movable platform 102 captures one or more image frames when the movable platform 102 moves along a navigation path. Method 500 proceeds to identify (512), within an image frame captured by the imaging device 216 borne on the movable platform 102, one or more objects corresponding to the sub-regions (e.g., the second boxes) respectively. FIG. 5E illustrates an exemplary image frame 550 captured by the imaging device 216 borne on the movable platform 102, in accordance with some embodiments. In some embodiments, the one or more objects (e.g., areas or boxes 552, 554, 556, and 558) corresponding to the sub-regions (e.g., second boxes 542, 544, 546, and 548) identified in the disparity map 520 at step 508 are identified on the image frame 550. In some embodiments, the sub-regions in the disparity map 520 are projected to respective objects in the image frame 550 based on spatial information of the movable platform 102 and spatial information of the imaging device 216. For example, data from IMU and GPS and data from gimbal for carrying the imaging device are used for calculating and identifying the objects within the image frame 550. In some embodiments, characteristic points and/or object matching algorithms are also used for identifying the objects in the imaging frame 550 that correspond to the sub-regions.

Method 500 proceeds to send (514) the image frame 550 and the determined distances associated with the one or more objects to an electronic device for display. In some embodiments, based on the current speed of the movable platform 102 and the corresponding distance, an estimated time-to-hit value for each object within the image frame 550 is calculated. The time-to-hit values are sent to the electronic device for display. For example, as shown in FIG. 5E, the respective distances and/or respective time-to-hit values (FIG. 5E) associated with the objects are displayed in real time in the image frame 550 as the movable platform 102 moves along a navigation path.

Figure 6A:
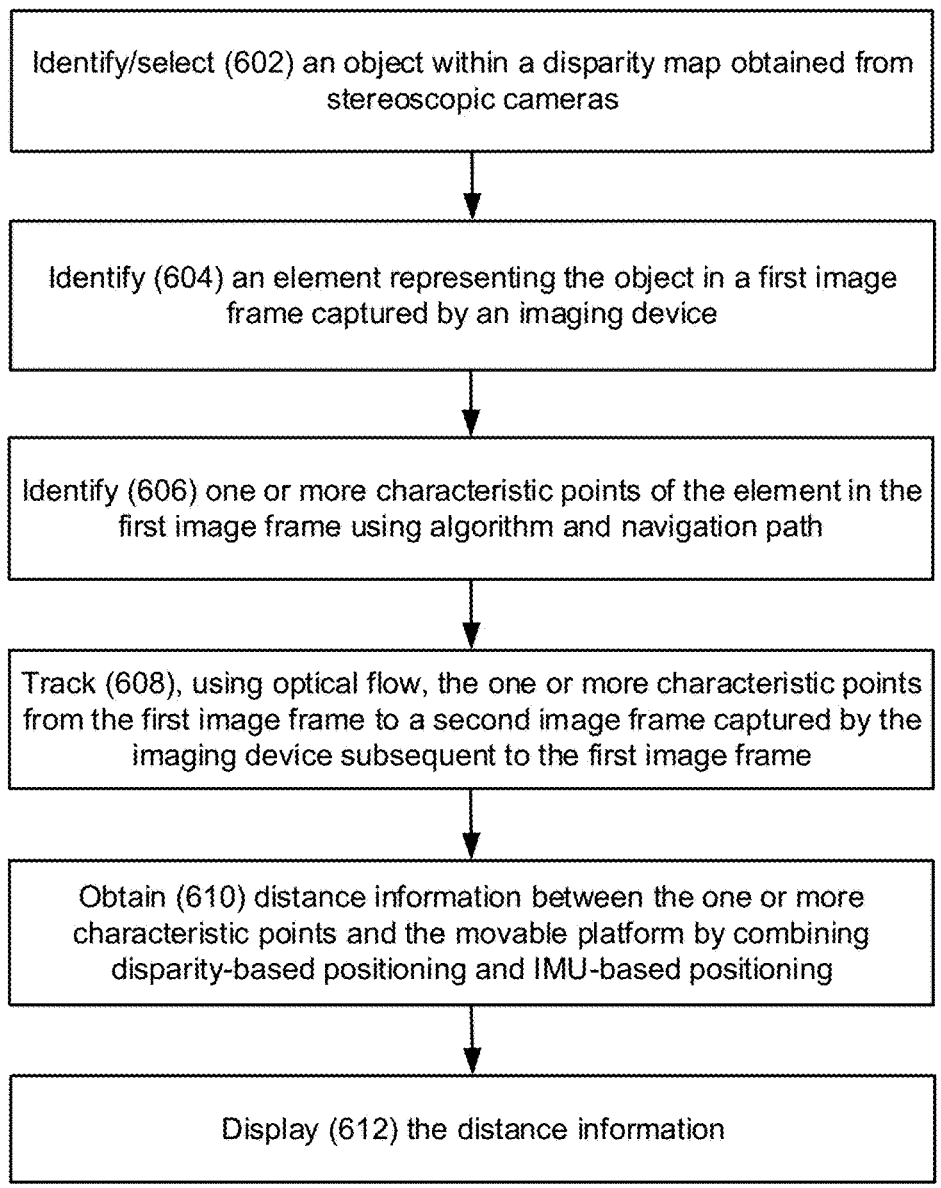
FIG. 6A is a diagram illustrating a method of processing image data including disparity map to track objects with a movable platform, in accordance with some embodiments.
Figure 6B:
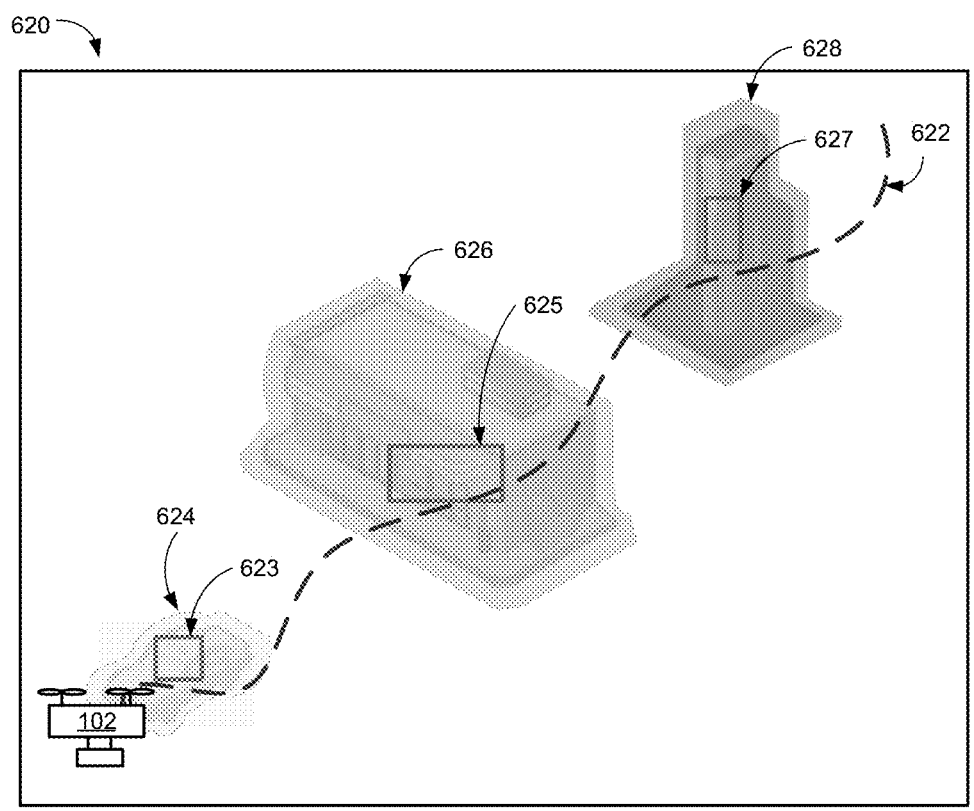
FIG. 6B illustrates a process of processing disparity map for tracking objects with a movable platform, in accordance with some embodiments.

FIG. 6A is a diagram illustrating a method 600 of processing image data including disparity map to track objects with the movable platform 102, in accordance with some embodiments. In some embodiments, method 600 is performed by an electronic device such as the computing device 110, the remote control 108, or the movable platform 102 (FIG. 1). For example, method 600 is performed by a controller of the image sensors 262, a controller of the imaging device 216, a controller of the movable platform 102, or a controller of the remote control 108. In some other embodiments, method 600 is performed by other electronic device(s), such as a mobile device or a computing device paired with the remote control 108 for operating the movable platform 102. Operations performed in FIG. 6A correspond to instructions stored in computer memories or other computer-readable storage mediums of the corresponding device(s). FIG. 6B illustrates a process of processing disparity map 620 for tracking objects with the movable platform 102, in accordance with some embodiments. One or more steps of method 600 are further illustrated in FIG. 6B, which are discussed in combination with FIG. 6A in the present disclosure.

In some embodiments, the electronic device identifies/selects (602) an object within a disparity map, such as disparity map 620 in FIG. 6B, obtained from stereoscopic cameras. In some embodiments, the disparity map 620 is obtained based on stereoscopic image frames captured by stereoscopic cameras (left stereographic image sensor 264 and right stereographic image sensor 266) borne on the movable platform 102. In some embodiments, the movable platform 102 is in an in-flight mode. For example, the movable platform 102 moves along a navigation path 622, FIG. 6B. In some embodiments, the disparity map is selected (e.g., pre-processed) using the 2-dimensional mask 350 as discussed with reference to FIGS. 3A and 3B. Only disparity map within the valid detection range of the stereoscopic imaging sensors is selected. Disparity values of the disparity map are compared with the 2-dimensional mask 350 to exclude pixels with disparity values lower than the threshold values of corresponding projection points on the 2-dimensional mask. In some embodiments, the electronic device selects an element representing an object, e.g., an obstacle or a target, or a portion of an obstacle or a target, within the disparity map 620. The element may include one or more pixels or one or more points in the disparity map. In some examples, the object, such as object 624, 626, or 628, or a nearest portion of the object, such as portion 623, 625, or 627, is selected using one or more steps of method 500 (FIGS. 5A-5E) or method 400 (FIGS. 4A-4D).

Figure 6C:
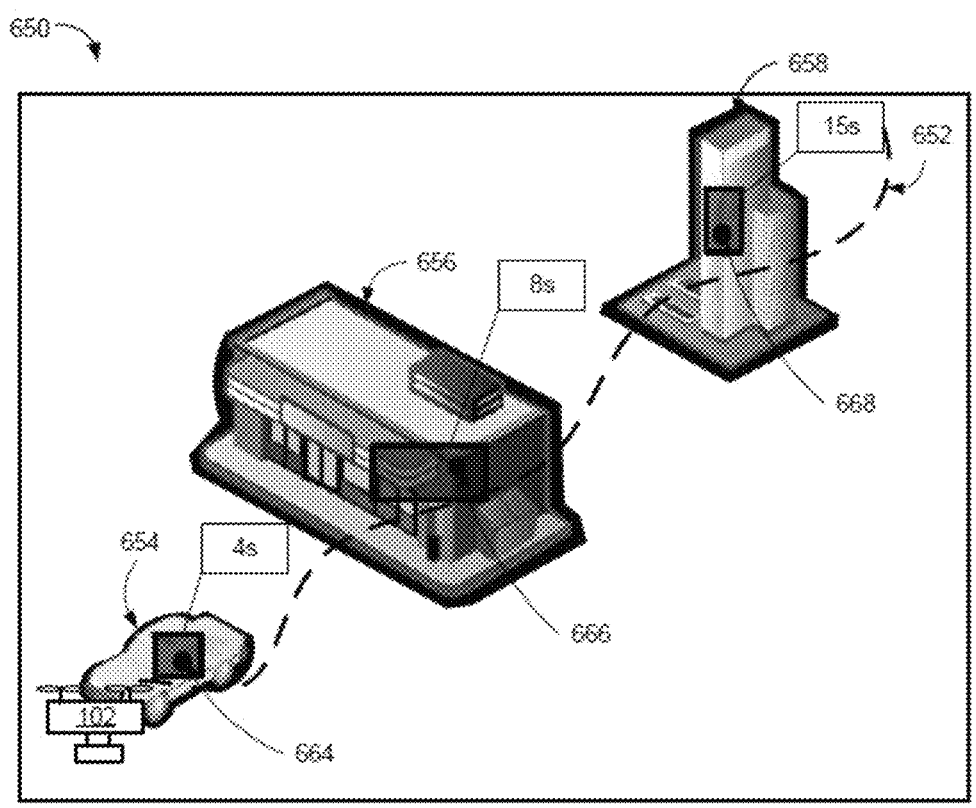
FIG. 6C illustrates an exemplary image frame captured by the imaging device borne on the movable platform, in accordance with some embodiments.

Method 600 proceeds to identify (604) an element representing the object in a first image frame captured by an imaging device. FIG. 6C illustrates an exemplary image frame 650 captured by the imaging device 216 borne on the movable platform 102, in accordance with some embodiments. The element representing is identified in the image frame 650 corresponding to the object identified in the disparity map 620, such as object 654 corresponding to object 624, object 656 corresponding to object 626, and object 658 corresponding to object 628. In some embodiments, one or more portions identified in the image frame 650 are the nearest portions of the object(s) in disparity map 620. The object(s) and/or portions of the object(s) may be identified in the image frame 650 using relative spatial information between the imaging device 216 and the stereoscopic imaging sensors borne on the movable platform 102. The relative spatial information may be identified from IMU, GPS and/or the gimbal for carrying the imaging device 216.

Method 600 proceeds to identify (606) one or more characteristic points, such as point 664, 666, or 668, of the corresponding element in the image frame 650 as shown in FIG. 6C. In some embodiments, the characteristic points are pixels having different characteristics compared to neighboring pixels, such as pixels having highest disparity values or grayscale values, or pixels having drastic changes. In some embodiments, the characteristic points are identified using suitable method, such as corner/edge detection algorithms (e.g., FAST, or HARRIS algorithms). In some embodiments, the characteristic points are selected using a machine learning model trained by historical data related to characteristic point selections. In some embodiments, a navigation path 652 of the movable platform 102 is estimated based on the current speed and the attitude data (e.g., orientation angles) of the movable platform 102. In some embodiments, the characteristic points, such as point 664, 666, or 668, are also identified to be close to the navigation path 652, as shown in FIG. 6C. For example, one or more points identified using the corner detection algorithm are further filtered to select the characteristic points that are within a predetermined distance range from the navigation path 652.

Method 600 proceeds to track (608) the identified characteristic points in two consecutive image frames that are captured by the imaging device 216. In some embodiments, the characteristic points are tracked using optical flow vectors from a first image frame to a second image frame. For example, motion trails of the tracking points are tracked using optical flow vectors generated from the characteristic points from the first image frame to the second image frame. The optical flow vectors can provide movement directions of the tracking points.

Method 600 proceeds to obtain (610) distance information between the characteristic points and the movable platform 102. In some embodiments, the distance information is determined by integrating disparity values obtained from an updated disparity map and IMU/GPS/gimbal data (e.g., speed and/or flying distance of the movable platform 102) of an updated location of the movable platform 102. In some embodiments, different weights are assigned to different data items for calculating the distance. For example, when an object is closer to the movable platform 102, e.g., within a distance range of 10 meters, a higher weight is assigned to disparity data because the stereoscopic sensors provide more accurate data in a nearer range. When the object is farther from the movable platform 102, e.g., outside a range of 10 meters, a higher weight is assigned to the IMU/GPS/gimbal data.

For example, initially an object is determined to be 20 meters from the movable platform 102 based on the disparity map. After a certain period of time of tracking, a distance determined based on an updated disparity value may be 8 meters; the IMU/GPS data shows the movable platform 102 has traveled for 15 meters. The current distance between this object and the movable platform 102 may be determined to be $d=a\times 8+b\times(20-15)$, where a>b, a+b=100%. In some embodiments, other data obtained from other type of sensors may also be used to integrate with the disparity data and IMU/GPS data to calculate the distance.

Method 600 proceeds to display (612) the distance information and/or the time-to-hit value (e.g., FIG. 6C) associated with each characteristic point. In some embodiments, in accordance with a determination that a distance between an object and the movable platform 102 is within a predetermined threshold value, such as closer than 15 meters or less than 4 seconds, the electronic device generates a notification to the user who is controlling the movable platform 102.

In some embodiments, if at step 608, the tracking of the characteristic points based on optical flow vectors fails, coordinates of the characteristic points can be calculated in an updated disparity map. For example, the characteristic points identified in the image frame can be projected to an updated disparity map using relative spatial information between the imaging device 216 and the movable platform 102. The coordinates of the characteristic points can be calculated using the disparity values and/or the IMU/GPS/gimbal data. The characteristic points can then be identified in the image frame based on relative spatial information between the imaging device 216 and the movable platform 102. Thus the tracking of the characteristic points will not be lost.

In some embodiments, as the movable platform 102 moves, if the object has moved to outside the field of view of the imaging device 216, or if the object has moved outside a valid detection range (e.g., beyond 15 meters from the movable platform 102) of the stereoscopic imaging sensors 264 and 266, the object tracking process may report an error in tracking.

Figure 7B:
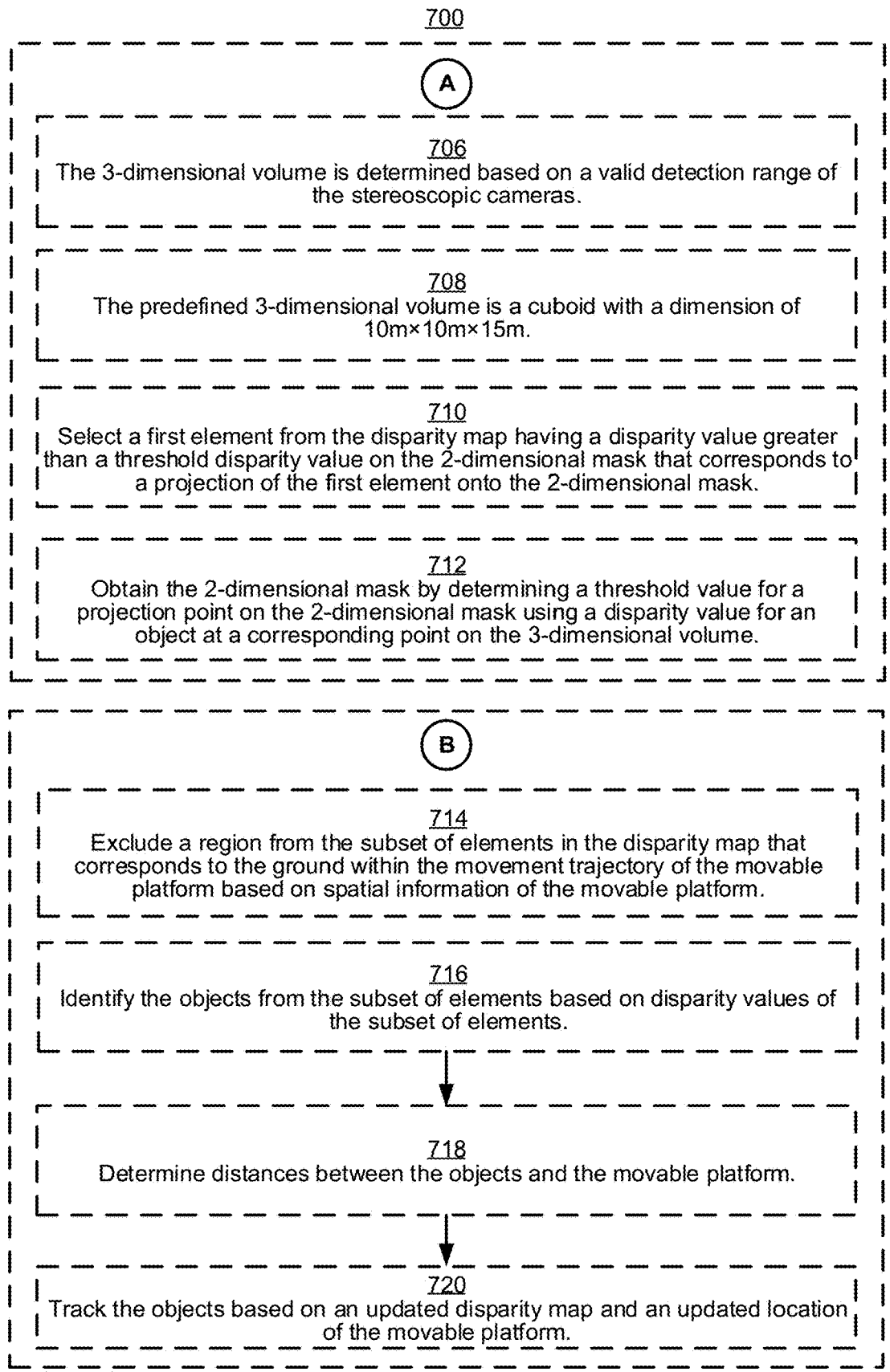

FIGS. 7A and 7B are a flow diagram illustrating a method 700 for selecting disparity map, in accordance with some embodiments. The method 700 is performed at an electronic device, such as the movable platform 102, the imaging device 216, the remote control 108, and/or the computing device 110. In some other embodiments, the method 700 is performed by other electronic device(s), such as a mobile device or a computing device paired with the remote control 108 for operating the movable platform 102. Operations performed in FIGS. 7A-7B correspond to instructions stored in computer memories or other computer-readable storage mediums of the corresponding device(s).

The electronic device obtains (701) a disparity map based on stereoscopic image frames captured by stereoscopic cameras (e.g., stereographic image sensors 264 and 266, FIG. 2C) borne on a movable platform (e.g., the movable platform 102).

The electronic device receives (702) a 2-dimensional mask (e.g., 2-dimensional mask 350, FIGS. 3B and 3D) including a plurality of projection points defining a predefined 3-dimensional volume (e.g., 3-dimensional volume 300, FIGS. 3A and 3C) adjacent the movable platform 102. Each projection point has a threshold disparity value for objects within the predefined 3-dimensional volume.

In some embodiments, the 3-dimensional volume 300 is (706) determined based on a valid detection range of the stereoscopic cameras. In some embodiments, the 3-dimensional volume is (708) a cuboid with a dimension of 10 m×10 m×15 m as shown in FIG. 3A.

In some embodiments, the electronic device selects (710) a first element (e.g., point P, FIG. 3A) in the disparity map having a disparity value greater than a threshold disparity value on the 2-dimensional mask that corresponds to a projection of the first element onto the 2-dimensional mask. In some embodiments, the electronic device obtains (712) the 2-dimensional mask by determining a threshold value for a projection point on the 2-dimensional mask using a disparity value for an object at a corresponding point on the 3-dimensional volume.

The electronic device selects (704), among the disparity map, a subset of elements. The subset of elements are selected by comparing disparity values of the elements with threshold disparity values on the 2-dimensional mask that correspond to projections of the elements onto the 2-dimensional mask. The subset of elements represents actual objects within the predefined 3-dimensional volume. In some embodiments, an element corresponds to a pixel, a point, and/or a group of pixels in the disparity map.

In some embodiments, the electronic device excludes (714) a region from the subset of elements in the disparity map that corresponds to the ground within the movement trajectory of the movable platform based on spatial information of the movable platform. In some embodiments, the electronic device identifies (716) the objects from the subset of elements based on disparity values of the subset of elements. The electronic device determines (718) distances between the objects and the movable platform. In some embodiments, the electronic device tracks (720) the objects based on an updated disparity map and an updated location of the movable platform 102.

Figure 8A:
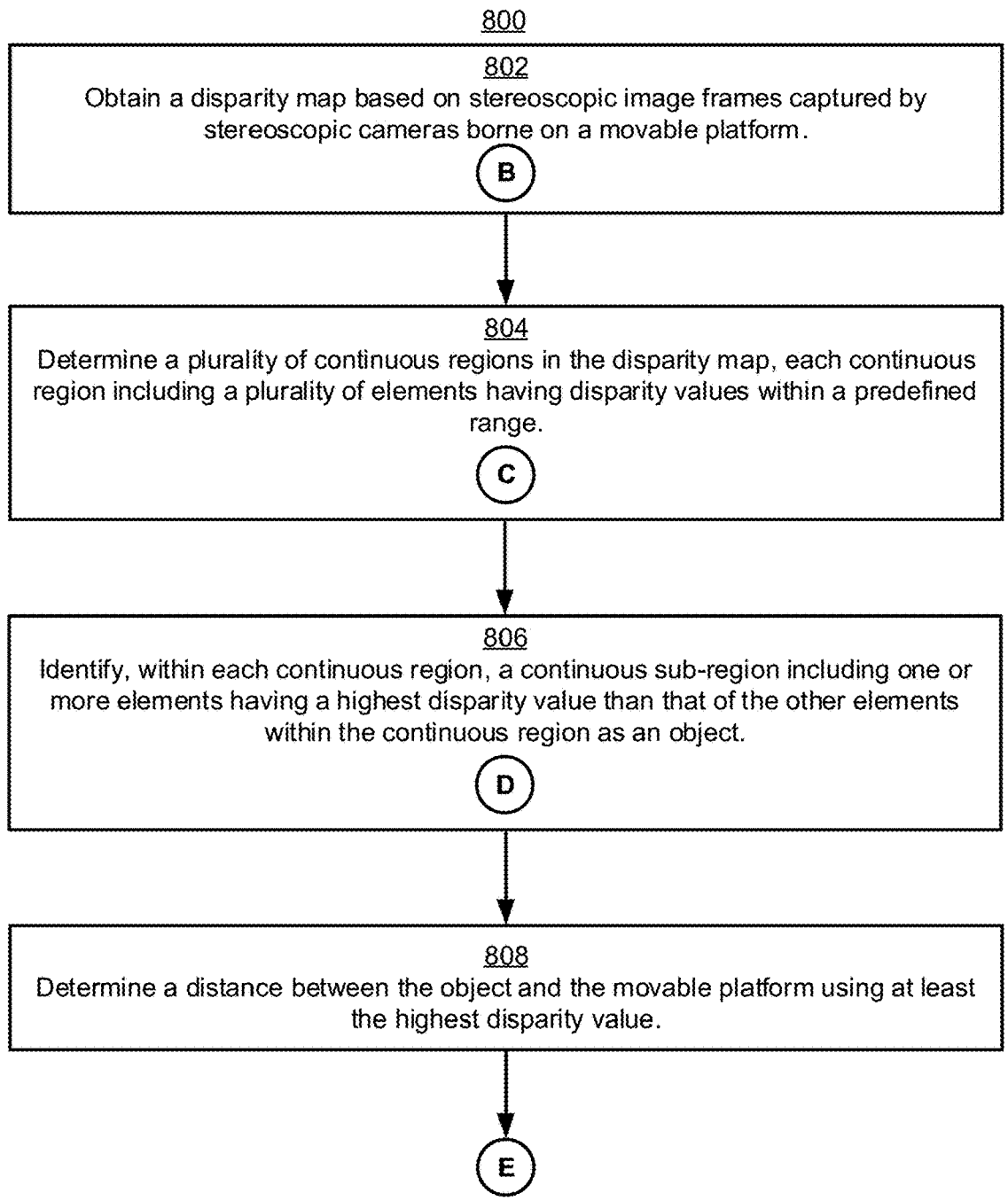
Figure 8B:
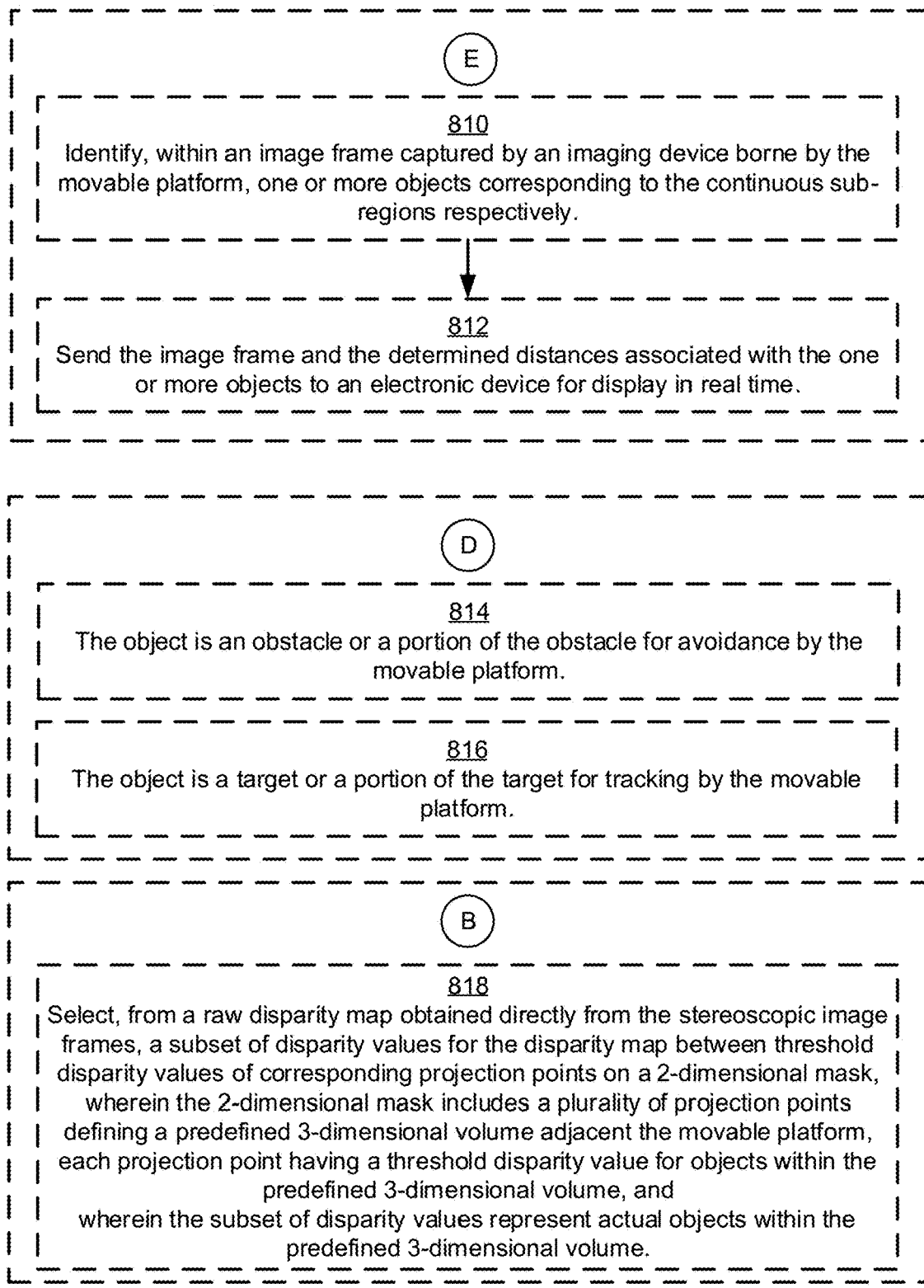

FIGS. 8A-8C are a flow diagram illustrating a method 800 for processing image data for detecting objects by the movable platform 102, in accordance with some embodiments. The method 800 is performed at an electronic device, such as the movable platform 102, the imaging device 216, the remote control 108, and/or the computing device 110. In some other embodiments, the method 800 is performed by other electronic device(s), such as a mobile device or a computing device paired with the remote control 108 for operating the movable platform 102. Operations performed in FIGS. 8A-8C correspond to instructions stored in computer memories or other computer-readable storage mediums of the corresponding device(s).

The electronic device obtains (802) a disparity map (e.g., disparity map 520, FIG. 5B) based on stereoscopic image frames captured by stereoscopic cameras (left stereographic image sensor 264 and right stereographic image sensor 266, FIG. 2B) borne on the movable platform 102. The disparity map can be generated based on a pair of stereoscopic grayscale images. The disparity map includes disparity values of one or more pixels corresponding to distances between two corresponding pixels in the pair of left and right stereoscopic images. The disparity value is related to depth information of a pixel (e.g., a distance between the object and the imaging sensor). The disparity map can be used for obtaining depth information, e.g., information related to a distance between the camera(s) and the object, of one or more objects in the image frames.

In some embodiments, the electronic device selects (818), from a raw disparity map obtained directly from the stereoscopic image frames, a subset of disparity values for the disparity map between threshold disparity values of corresponding projection points on a 2-dimensional mask (e.g., 2-dimensional mask 350, FIGS. 3B and 3D). The 2-dimensional mask includes a plurality of projection points defining a predefined 3-dimensional volume (e.g., 3-dimensional volume 300, FIGS. 3A and 3C) adjacent the movable platform, each projection point having a threshold disparity value for objects within the predefined 3-dimensional volume. The subset of disparity values represents actual objects within the predefined 3-dimensional volume.

The electronic device determines (804) a plurality of continuous regions (e.g., regions 432, 434, 436, and 438, FIG. 4C; boxes 532, 534, 536, and 538, FIG. 5C) in the disparity map. Each continuous region includes a plurality of elements having disparity values within a predefined range. For example, a continuous region includes pixels within 0.5 meters or within 2 pixels. The electronic device identifies (806), within each continuous region, a continuous sub-region (e.g., pixel 426, 442, 446, or 44, FIG. 4C; box 542, 544, 546, or 548, FIG. 5D) including one or more elements having a highest disparity value (i.e., being closest to the movable platform 102) than that of the other elements within the continuous region as an object.

In some embodiments as illustrated in FIGS. 4A-4D, determining the plurality of continuous regions comprises (820) dividing the disparity map into a plurality of areas using a grid (e.g., grid 422, FIG. 4B); identifying an element having a highest disparity value in each area (such as pixel 424, 426 in FIG. 4B). In some embodiments, determining the plurality of continuous regions also comprises (820) selecting, within each area, one or more contiguous elements to form a respective continuous region of the plurality of continuous regions (e.g., as regions 432, 434, 436, and 438, FIG. 4C). The differences between respective disparity values of the contiguous elements and the highest disparity value are within the predefined range. In some examples, distances between objects in the world coordinate system corresponding to the one or more contiguous elements and an object corresponding to the element with the highest disparity value are within a predefined range, e.g., 0.5 meters.

In some embodiments as illustrated in FIGS. 5A-5E, differences of disparity values between neighboring elements of the plurality of elements in each continuous region (e.g., region 522, 524, 526, or 528, FIG. 5B) are within the predefined range, such as 2 pixels. In some embodiments, the electronic device determines (824) a plurality of first boxes enclosing the plurality of continuous regions respectively, such as boxes 532, 534, 536, and 538.

In some embodiments, the electronic device determines (826) a second box (e.g., box 542, 544, 546, or 548, FIG. 5D) within each first box (e.g., boxes 532, 534, 536, and 538, FIG. 5C) as a continuous sub-region. The second box encloses the one or more elements with the highest disparity values in the corresponding first box. In some embodiments, elements within a second box have disparity values within a range from (Dmax+Dmin)/2 to Dmax. Dmax and Dmin correspond to the highest disparity value and the lowest disparity value respectively within a corresponding first box enclosing the second box. In some other embodiments, elements within a second box have disparity values within a range, e.g., 80%-100% of the highest disparity value within the corresponding first box.

In some embodiments, the electronic device tracks (830) the objects as the movable platform 102 moves along a navigation path based on an updated disparity map and an updated location of the movable platform. In some embodiments, the object is (814) an obstacle or a portion of the obstacle for avoidance by the movable platform 102. In some embodiments, the object is (816) a target or a portion of the target for tracking by the movable platform.

The electronic device determines (808) a distance between the object and the movable platform using at least the highest disparity value. In some embodiments, the electronic device identifies (810), within an image frame (e.g., image frame 450, FIG. 4D; image frame 550, FIG. 5E) captured by the imaging device 216 borne by the movable platform 102, one or more objects corresponding to the continuous sub-regions respectively, such as pixels 452, 454, 456, and 458 in FIG. 4D, or boxes 552, 554, 556, and 558 in FIG. 5E. The one or more objects may be identified within the image frame using relative spatial information of the imaging device 216 and the movable platform 102. The one or more objects may be identified in the image frame using characteristic points and/or object matching. In some embodiments, the electronic device sends (812) the image frame and the determined distances associated with the one or more objects to an electronic device (such as a display of the remote control 108 or a mobile device coupled to the remote control 108) for display in real time.

FIGS. 9A-9C are a flow diagram illustrating a method 900 for processing image data for tracking objects by the movable platform 102, in accordance with some embodiments. The method 900 is performed at an electronic device, such as the movable platform 102, the imaging device 216, the remote control 108, and/or the computing device 110. In some other embodiments, the method 900 is performed by other electronic device(s), such as a mobile device or a computing device paired with the remote control 108 for operating the movable platform 102. Operations performed in FIGS. 9A-9C correspond to instructions stored in computer memories or other computer-readable storage mediums of the corresponding device(s).

The electronic device identifies (902), within a disparity map (e.g., disparity map 620, FIG. 6B), an object (e.g., object 626 or portion 625 of the object 626, FIG. 6B) for tracking by the movable platform 102. In some embodiments, the electronic device obtains (910) the disparity map based on stereoscopic image frames captured by stereoscopic cameras borne on the movable platform 102. In some embodiments, the electronic device determines (912) a continuous region including one or more elements having disparity values within a predefined range as the object, the disparity values of the one or more elements being higher than that of the other elements within the continuous region. In some embodiments, the electronic device selects (914), from a raw disparity map obtained directly from the stereoscopic image frames, a subset of disparity values for the disparity map between threshold disparity values of corresponding projection points on a 2-dimensional mask (e.g., 2-dimensional mask 350, FIGS. 3B and 3D). The 2-dimensional mask includes a plurality of projection points defining a predefined 3-dimensional volume (e.g., 3-dimensional volume 300, FIGS. 3A and 3C) adjacent the movable platform. Each projection point has a threshold disparity value for objects within the predefined 3-dimensional volume. The subset of disparity values represents actual objects within the predefined 3-dimensional volume.

The electronic device determines (904) a location of an element representing the object in a first image frame (e.g., image frame 650) captured by the imaging device 216 borne on the movable platform 102. In some embodiments, the location of the element on the first image frame is (918) determined based on relative spatial information between the imaging device 216 and the movable platform 102. For example, the object is projected to the image frame based on IMU/GPS/gimbal data.

The electronic device selects (906) one or more characteristic points (e.g., points 664, 666, 668, FIG. 6C) of the element representing the object as tracking points of the object on the first image frame. In some embodiments, the one or more characteristic points are (916) selected to be closer to a navigation path (e.g., navigation path 652, FIG. 6C) of the movable platform 102 than other parts of the object. In some embodiments, the characteristic points are selected using corner detection algorithm, such as FAST, HARRIS algorithm. In some embodiments, the characteristic points are selected using a machine learning model trained by historical data related to characteristic point selections. In some embodiments, the navigation path is determined based on speed and attitude data of the movable platform 102.

The electronic device updates (908) the locations of the characteristic points (e.g., tracking points) of the element on a second image frame captured by the imaging device 216 in accordance with an updated disparity map and a current location of the movable platform 102. In some embodiments, the current location of the movable platform 102 is (920) determined based on data from a plurality of sensors associated with the movable platform 102, such as spatial data from IMU, GPS, and disparity data from stereoscopic cameras. In some embodiments, updating the locations of the tracking points on the second image frame further comprises (922) tracking motion trails of the tracking points using optical flow generated from the tracking points from the first image frame to the second image frame.

In some embodiments, the electronic device determines (924) a distance between the object and the movable platform 102 based on information obtained from the updated disparity map. For example, the electronic device integrates data from stereoscopic cameras (disparity map) and IMU/GPS (speed, flying distance) of the movable platform 102. The electronic device assigns different weights to the disparity data and to the IMU/GPS data. For example, when the movable platform 102 moves closer to the object, a greater weight is assigned to the disparity data. When the movable platform 102 is farther from the object, a greater weight is assigned to the IMU/GPS data.

In some embodiments, in accordance with a determination that the distance between the object and the movable platform is within a predetermined threshold value, the electronic device generates (926) a notification to be sent to a controlling device of the movable platform 102.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202, processors of the remote control 108, processors of the computing device 110, and/or processors of the imaging device 216) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method, comprising:
   obtaining a disparity map based on stereoscopic image frames captured by stereoscopic cameras borne on a movable platform;
   determining a plurality of continuous regions in the disparity map, each continuous region including a plurality of elements having disparity values within a predefined range;
   identifying, within each continuous region, a continuous sub-region including one or more elements having a highest disparity value among the elements within the continuous region as an object; and
   determining a distance between the object and the movable platform using at least the highest disparity value.

2. The method of claim 1, further comprising:
   identifying, within an image frame captured by an imaging device borne by the movable platform, one or more objects each corresponding to one of the continuous sub-regions.

3. The method of claim 2, further comprising:
   sending the image frame and one or more determined distances associated with the one or more objects to an electronic device for display in real time.

4. The method of claim 1, wherein the object is an obstacle or a portion of the obstacle for avoidance by the movable platform.

5. The method of claim 1, wherein the object is a target or a portion of the target for tracking by the movable platform.

6. The method of claim 1, wherein determining the plurality of continuous regions comprises:
   dividing the disparity map into a plurality of areas using a grid;
   identifying an element having a highest disparity value in each area; and
   selecting, within each area, one or more contiguous elements to form a respective continuous region of the plurality of continuous regions, wherein differences between respective disparity values of the contiguous elements and the highest disparity value in the each area are within the predefined range.

7. The method of claim 1, wherein differences of disparity values between neighboring elements of the plurality of elements in each continuous region are within the predefined range.

8. The method of claim 7, further comprising:
   determining a plurality of first boxes enclosing the plurality of continuous regions respectively.

9. The method of claim 8, further comprising:
   determining a second box within each first box as a continuous sub-region, the second box enclosing one or more elements with the highest disparity values in the corresponding first box, wherein elements within a second box have disparity values within a range from (Dmax+Dmin)/2 to Dmax, wherein Dmax and Dmin correspond to a highest disparity value and a lowest disparity value respectively within a corresponding first box enclosing the second box.

10. The method of claim 1 further comprising:
    tracking the object as the movable platform moves along a navigation path based on an updated disparity map and an updated location of the movable platform.

11. The method of claim 1, further comprising:
    selecting, from a raw disparity map obtained directly from the stereoscopic image frames, a subset of elements by comparing disparity values of the elements with threshold disparity values on a 2-dimensional mask that correspond to projection points of the elements on the 2-dimensional mask,
    wherein the 2-dimensional mask includes a plurality of projection points defining a predefined 3-dimensional volume adjacent the movable platform, each projection point having a threshold disparity value for objects within the predefined 3-dimensional volume, and
    wherein the subset of elements represent actual objects within the predefined 3-dimensional volume.

12. A system for processing image data, the system comprising:
    one or more processors; and
    memory storing one or more programs configured to be executed by the one or more processors, the one or more programs including instructions for:
        obtaining a disparity map based on stereoscopic image frames captured by stereoscopic cameras borne on a movable platform;
        determining a plurality of continuous regions in the disparity map, each continuous region including a plurality of elements having disparity values within a predefined range;
        identifying, within each continuous region, a continuous sub-region including one or more elements having a highest disparity value among the elements within the continuous region as an object; and
        determining a distance between the object and the movable platform using at least the highest disparity value.

13. The system of claim 12, wherein the one or more programs further include instructions for:
    identifying, within an image frame captured by an imaging device borne by the movable platform, one or more objects each corresponding to one of the continuous sub-regions.

14. The system of claim 13, wherein the one or more programs further include instructions for:

sending the image frame and one or more determined distances associated with the one or more objects to an electronic device for display in real time.

15. The system of claim 12, wherein the object is an obstacle or a portion of the obstacle for avoidance by the movable platform.

16. The system of claim 12, wherein the object is a target or a portion of the target for tracking by the movable platform.

17. The system of claim 12, wherein the instruction for determining the plurality of continuous regions further comprises instructions for:
dividing the disparity map into a plurality of areas using a grid;
identifying an element having a highest disparity value in each area; and
selecting, within each area, one or more contiguous elements to form a respective continuous region of the plurality of continuous regions, wherein differences between respective disparity values of the contiguous elements and the highest disparity value in the each area are within the predefined range.

18. The system of claim 12, wherein differences of disparity values between neighboring elements of the plurality of elements in each continuous region are within the predefined range.

19. The system of claim 12, wherein the one or more programs further include instructions for:
selecting, from a raw disparity map obtained directly from the stereoscopic image frames, a subset of elements by comparing disparity values of the elements with threshold disparity values on a 2-dimensional mask that correspond to projection points of the elements on the 2-dimensional mask,
wherein the 2-dimensional mask includes a plurality of projection points defining a predefined 3-dimensional volume adjacent the movable platform, each projection point having a threshold disparity value for objects within the predefined 3-dimensional volume, and
wherein the subset of elements represent actual objects within the predefined 3-dimensional volume.

20. An unmanned aerial vehicle (UAV), comprising:
a propulsion system;
one or more sensing devices including stereoscopic cameras; and
one or more processors coupled to the propulsion system and the one or more sensing devices, the one or more processors being configured for:
obtaining a disparity map based on stereoscopic image frames captured by the stereoscopic cameras;
determining a plurality of continuous regions in the disparity map, each continuous region including a plurality of elements having disparity values within a predefined range;
identifying, within each continuous region, a continuous sub-region including one or more elements having a highest disparity value among the elements within the continuous region as an object; and
determining a distance between the object and the movable platform using at least the highest disparity value.

* * * * *